US011948564B2

(12) United States Patent
Iwase et al.

(10) Patent No.: US 11,948,564 B2
(45) Date of Patent: Apr. 2, 2024

(54) INFORMATION PROCESSING DEVICE AND INFORMATION PROCESSING METHOD

(71) Applicant: SONY CORPORATION, Tokyo (JP)

(72) Inventors: Hiro Iwase, Tokyo (JP); Yuhei Taki, Tokyo (JP); Kunihito Sawai, Tokyo (JP)

(73) Assignee: SONY CORPORATION, Tokyo (JP)

(*) Notice: Subject to any disclaimer, the term of this patent is extended or adjusted under 35 U.S.C. 154(b) by 602 days.

(21) Appl. No.: 16/973,026

(22) PCT Filed: Mar. 13, 2019

(86) PCT No.: PCT/JP2019/010264
§ 371 (c)(1),
(2) Date: Dec. 7, 2020

(87) PCT Pub. No.: WO2019/239659
PCT Pub. Date: Dec. 19, 2019

(65) Prior Publication Data
US 2021/0272563 A1    Sep. 2, 2021

(30) Foreign Application Priority Data

Jun. 15, 2018 (JP) .................................. 2018-114566

(51) Int. Cl.
*G10L 15/22* (2006.01)
*G10L 13/04* (2013.01)
(Continued)

(52) U.S. Cl.
CPC .............. *G10L 15/22* (2013.01); *G10L 13/04* (2013.01); *G10L 15/063* (2013.01); *G10L 15/1815* (2013.01); *G10L 15/32* (2013.01)

(58) Field of Classification Search
CPC .......... G10L 15/32; G10L 15/30; G10L 15/22
See application file for complete search history.

(56) References Cited

U.S. PATENT DOCUMENTS 6,195,641 B1 * 2/2001 Loring .................... G10L 15/30
                                                          704/E15.047
10,354,650 B2 * 7/2019 Gruenstein ............. G10L 15/32
(Continued)

FOREIGN PATENT DOCUMENTS

JP    2017-207610 A    11/2017
JP    2018-005061 A     1/2018
(Continued)

OTHER PUBLICATIONS

International Search Report and Written Opinion of PCT Application No. PCT/JP2019/010264, dated Apr. 16, 2019, 06 pages of ISRWO.

*Primary Examiner* — Douglas Godbold
(74) *Attorney, Agent, or Firm* — CHIP LAW GROUP

(57) ABSTRACT

Provided is an information processing device including a response control unit that controls a response to a user's utterance based on a first utterance interpretation result and a second utterance interpretation result. The first utterance interpretation result is a result of natural language understanding processing for an utterance text generated by automatic speech recognition processing based on the user's utterance and the second utterance interpretation result is an interpretation result acquired based on learning data in which the first utterance interpretation result and the utterance text used to acquire the first utterance interpretation result are associated with each other. The response control unit further controls the response to the user's utterance based on the second utterance interpretation result in a case where the second utterance interpretation result is acquired based on the user's utterance before acquisition of the first utterance interpretation result.

18 Claims, 25 Drawing Sheets

(51) Int. Cl.
*G10L 15/06* (2013.01)
*G10L 15/18* (2013.01)
*G10L 15/32* (2013.01)

(56) References Cited

U.S. PATENT DOCUMENTS

| | | | | |
|---|---|---|---|---|
| 10,388,277 | B1* | 8/2019 | Ghosh | G10L 15/1822 |
| 10,777,203 | B1* | 9/2020 | Pasko | G10L 15/18 |
| 10,896,675 | B1* | 1/2021 | Lam | G10L 15/30 |
| 2004/0010409 | A1* | 1/2004 | Ushida | G10L 15/30 |
| | | | | 704/E15.047 |
| 2010/0161328 | A1* | 6/2010 | Krumel | G10L 15/30 |
| | | | | 704/236 |
| 2011/0015928 | A1* | 1/2011 | Odell | G10L 15/30 |
| | | | | 704/275 |
| 2011/0184740 | A1* | 7/2011 | Gruenstein | G10L 15/30 |
| | | | | 704/275 |
| 2013/0132084 | A1* | 5/2013 | Stonehocker | G10L 15/04 |
| | | | | 704/244 |
| 2013/0132086 | A1* | 5/2013 | Xu | G10L 15/005 |
| | | | | 704/251 |
| 2013/0132089 | A1* | 5/2013 | Fanty | G10L 21/00 |
| | | | | 704/270 |
| 2013/0151250 | A1* | 6/2013 | VanBlon | G10L 15/30 |
| | | | | 704/235 |
| 2015/0279352 | A1* | 10/2015 | Willett | G10L 19/0017 |
| | | | | 704/231 |
| 2015/0340033 | A1* | 11/2015 | Di Fabbrizio | G10L 15/18 |
| | | | | 704/254 |
| 2016/0189715 | A1* | 6/2016 | Nishikawa | G10L 15/32 |
| | | | | 704/232 |
| 2016/0379626 | A1* | 12/2016 | Deisher | G10L 15/197 |
| | | | | 704/235 |
| 2017/0032783 | A1* | 2/2017 | Lord | G06F 3/167 |
| 2017/0148441 | A1 | 5/2017 | Fujii | |
| 2018/0122366 | A1* | 5/2018 | Nishikawa | G06F 3/167 |
| 2018/0211668 | A1* | 7/2018 | Willett | G10L 15/30 |
| 2018/0358019 | A1* | 12/2018 | Mont-Reynaud | G10L 15/063 |
| 2019/0244608 | A1* | 8/2019 | Choi | G10L 15/08 |
| 2019/0295552 | A1* | 9/2019 | Pasko | G10L 15/30 |
| 2021/0074286 | A1* | 3/2021 | Cotting | G10L 15/30 |
| 2021/0358502 | A1* | 11/2021 | Kim | G10L 15/063 |
| 2022/0366904 | A1* | 11/2022 | Martinson | G10L 15/22 |

FOREIGN PATENT DOCUMENTS

| | | |
|---|---|---|
| JP | 2018-045190 A | 3/2018 |
| JP | 2018-081185 A | 5/2018 |
| WO | 2016/151699 A1 | 9/2016 |
| WO | 2018/092786 A1 | 5/2018 |

* cited by examiner

FIG.7B

```
Speech:Play the song by Atrist B,
Intent:PlayMusic,
Entity: Artist B,
TotalCount:10,
Context[
  {type:TimeZome,
    literal:morning,
    Count:10}
  {type:DayOfTheWeek,
    literal:sunday,
    Count:10}
]
```
~ LD11

FIG.8A

[★ADOPT]  LD12

```
Speech:Play the song by Artist B,
Intent:PlayMusic,
Entity:Artist B,
TotalCount:30,
Context[
  {type:FaceID,
    literal: CHILD,
    Count:28},
  {type:FaceID,
    literal: ADULT,
    Count:2},
  {type:ChildID,
    literal: ELDEST SON,
    Count:25},
  {type:ChildID,
    literal: SECOND SON,
    Count:3}
]
```

LD13

```
Speech:Play the song by Artist D,
Intent:PlayMusic,
Entity:Artist D,
TotalCount:20,
Context[
  {type:FaceID,
    literal: CHILD,
    Count:17},
  {type:FaceID,
    literal: ADULT,
    Count:3},
  {type:ChildID,
    literal: ELDEST SON,
    Count:2},
  {type:ChildID,
    literal: SECOND SON,
    Count:15}
]
```

$$\left[ \begin{array}{l} \vec{C} = (28/30) + (25/30) \\ = 0.93 + 0.83 \\ = 1.76 \end{array} \right] > \left[ \begin{array}{l} \vec{C} = (17/20) + (2/20) \\ = 0.85 + 0.1 \\ = 0.95 \end{array} \right]$$

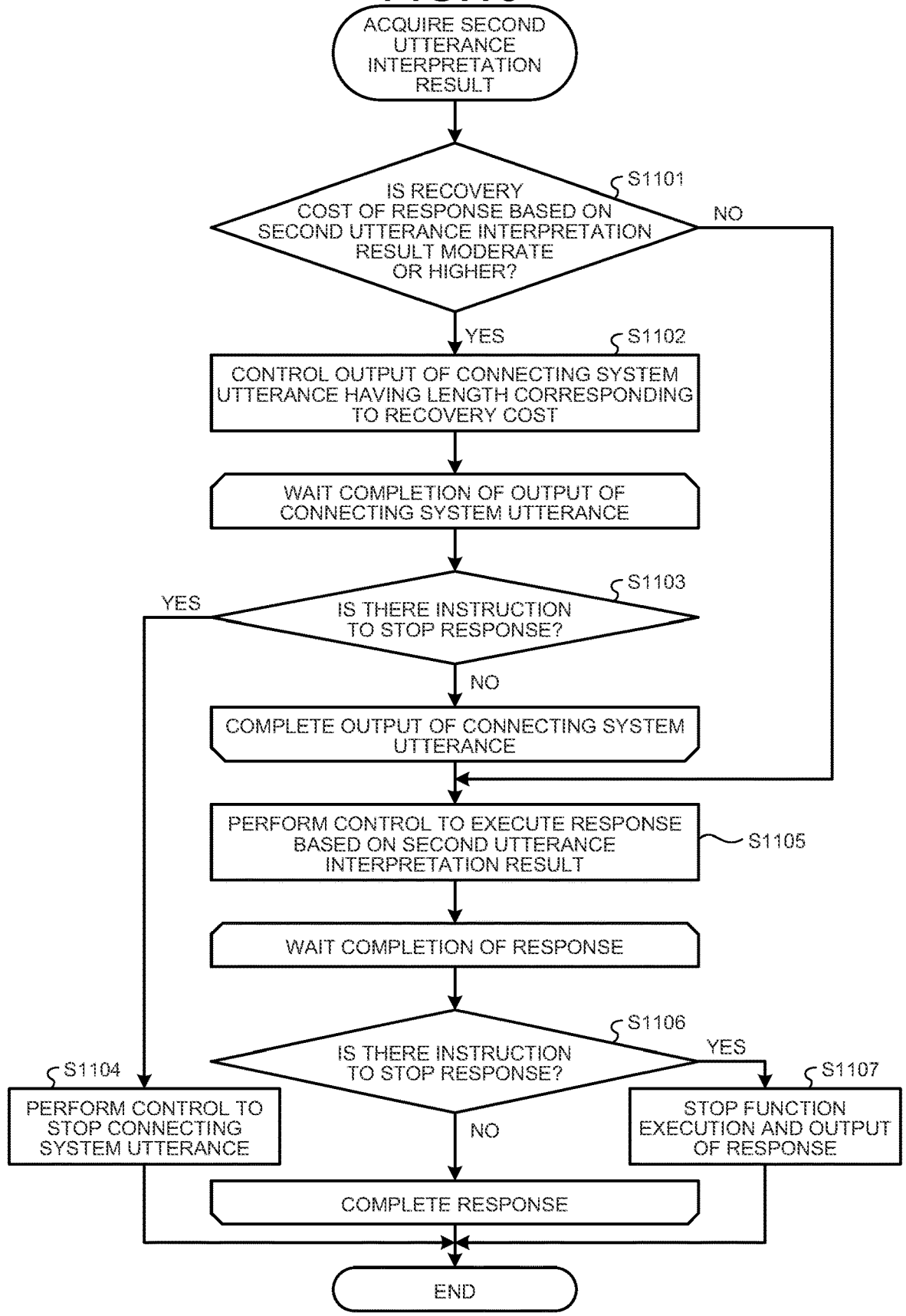

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/010264 filed on Mar. 13, 2019, which claims priority benefit of Japanese Patent Application No. JP 2018-114566 filed in the Japan Patent Office on Jun. 15, 2018. Each of the above-referenced applications is hereby incorporated herein by reference in its entirety.

FIELD

The present disclosure relates to an information processing device and an information processing method.

BACKGROUND

In recent years, a device that provides various functions to a user through voice interaction has become widespread. In addition, a number of technologies for improving convenience of a user who uses the above-described device have been proposed. For example, Patent Literature 1 discloses a technology in which speech recognition processing is performed for a user's utterance by both a client and a server, and a response is made based on a difference between two acquired speech recognition results.

CITATION LIST

Patent Literature

Patent Literature 1: JP 2018-45190 A

SUMMARY

Technical Problem

Generally, it is considered that, in a device that makes a response based on speech recognition processing, the shorter the time taken from input of a user's utterance to output of a response to the utterance, the higher the satisfaction of the user. However, the technology described in Patent Literature 1 does not sufficiently consider the response time as described above.

Therefore, the present disclosure proposes a novel and improved information processing device and information processing method that can effectively reduce a response time to a user's utterance.

Solution to Problem

According to the present disclosure, an information processing device is provided that includes: a response control unit that controls a response to a user's utterance based on a first utterance interpretation result and a second utterance interpretation result, wherein the first utterance interpretation result is a result of natural language understanding processing for an utterance text generated by automatic speech recognition processing based on the user's utterance, the second utterance interpretation result is an interpretation result acquired based on learning data in which the first utterance interpretation result and the utterance text used to acquire the first utterance interpretation result are associated with each other, and the response control unit controls the response to the user's utterance based on the second utterance interpretation result in a case where the second utterance interpretation result is acquired based on the user's utterance before acquisition of the first utterance interpretation result.

Moreover, according to the present disclosure, an information processing method is provided that includes: controlling a response to a user's utterance based on a first utterance interpretation result and a second utterance interpretation result, wherein the first utterance interpretation result is a result of natural language understanding processing for an utterance text generated by automatic speech recognition processing based on the user's utterance, the second utterance interpretation result is an interpretation result acquired based on learning data in which the first utterance interpretation result and the utterance text used to acquire the first utterance interpretation result are associated with each other, and the controlling of the response further includes controlling the response to the user's utterance based on the second utterance interpretation result in a case where the second utterance interpretation result is acquired based on the user's utterance before acquisition of the first utterance interpretation result.

Advantageous Effects of Invention

As described above, according to the present disclosure, it is possible to effectively reduce a response time to a user's utterance.

Note that the above-described effect is not necessarily limitative, and any of effects described in the present specification or other effects that can be understood from the present specification may be exhibited in addition to or in place of the above effects.

BRIEF DESCRIPTION OF DRAWINGS

FIG. 7B is a diagram illustrating an example of another learning data registered in the personalization DB 135 according to the embodiment.

FIG. 8A is a diagram illustrating an example of another learning data registered in the personalization DB 135 according to the embodiment.

FIG. 10 is a flowchart illustrating a flow of a response control performed by the information processing terminal according to the embodiment.

DESCRIPTION OF EMBODIMENTS

Figure 1:
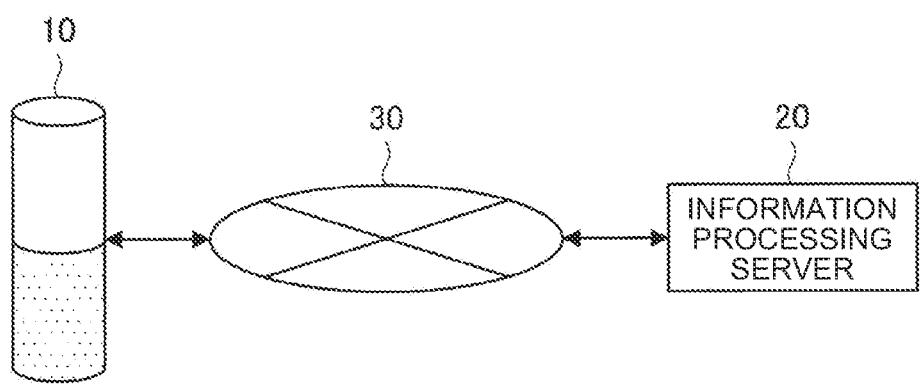
FIG. 1 is a block diagram illustrating a configuration example of an information processing system according to an embodiment of the present disclosure.

Hereinafter, preferred embodiments of the present disclosure will be described in detail with reference to the accompanying drawings. In the present specification and the drawings, components having substantially the same functional configuration will be denoted by the same reference numerals to omit an overlapping description.

Note that the description will be provided in the following order.
1. Embodiment
1.1. Background
1.2. System Configuration Example
1.3. Functional Configuration Example of Information Processing Terminal 10
1.4. Functional Configuration Example of Information Processing Server 20
1.5. Details of Functions
1.6. Control Flow
1.7. Effects
2. Hardware Configuration Example
3. Conclusion

1. EMBODIMENT

1.1. Background

First, a background of an embodiment of the present disclosure will be described. As described above, in recent years, a system that provides various functions to a user through voice interaction has become widespread. In the above-described system, generally, a voice interaction session with a user is started by recognizing a preset wake up word (WUW) using a speech recognition function of a client. In addition, after the start of the voice interaction session, a server performs automatic speech recognition (ASR) and natural language understanding (NLU) on speech data for a user's utterance collected by the client to interpret an intent of the user's utterance, and processing corresponding to the intent is performed.

Here, a time taken from when the user's utterance is input to when a response is made may be increased due to various factors. For example, in a case where a voice interaction system is constructed by combining a client function and a server function as described above, a time is required to access a network, and as a result, a response is delayed.

In addition, since automatic speech recognition in a general-purpose server supports various utterances of a user, a time taken to determine the end of an utterance tends to be long. Therefore, a long time is taken from when a user's utterance ends to when the end of the user's utterance is detected by the automatic speech recognition function and subsequent processing starts.

Furthermore, an increase in response time due to processing performed by the server, such as an increase in time required to acquire information from various services on the network after the natural language understanding or time required to perform speech synthesis (text to speech (TTS)) for response often occurs.

Here, all of the automatic speech recognition, the natural language understanding, and the speech synthesis may be performed by the client in order to avoid such an increase described above, but in this case, a load on the client is significantly increased. Therefore, the client needs to be configured to have a high performance, which results in a significant increase in manufacturing cost.

For the above reasons, at present, in the voice interaction system, all the above-described processings are often performed by the server, and an increase in response time is one of the factors that reduce the convenience.

In addition, even when the user performs a habitual and frequent operation by utterance, the user should utter every time so that the natural language understanding is normally performed by the server. Specifically, the user should correctly utter an intent of function execution which is an operation target, and an entity of the function execution by using a phrase that the server can understand, which is a heavy load.

The technical idea according to the present disclosure was conceived in view of the foregoing point, and it is possible to effectively reduce a response time to a user's utterance. Therefore, an information processing terminal 10 that implements an information processing method according to an embodiment of the present disclosure includes a response control unit 140 that controls a response to a user's utterance based on a first utterance interpretation result and a second utterance interpretation result. The first utterance interpretation result is a result of natural language understanding processing for an utterance text generated by automatic speech recognition processing based on the user's utterance, and the second utterance interpretation result may be an interpretation result acquired based on learning data in which the first utterance interpretation result and the utterance text used to acquire the first utterance interpretation result are associated with each other. Here, the response control unit 140 according to the present embodiment controls a response to the user's utterance based on the second utterance interpretation result in a case where the second utterance interpretation result is acquired based on the user's utterance before acquisition of the first utterance interpretation result, which is one of the characteristics.

Hereinafter, the above-described characteristics of the information processing terminal 10 according to the present embodiment and the effects produced by the characteristics will be described in detail.

1.2. System Configuration Example

First, a configuration example of the information processing system according to the embodiment of the present disclosure will be described. FIG. 1 is a block diagram illustrating a configuration example of the information processing system according to the present embodiment. Referring to FIG. 1, the information processing system according to the present embodiment includes the information processing terminal and an information processing server 20. Further, the information processing terminal 10 and the information processing server 20 are connected to each other via a network so as to be capable of performing communication with each other.

(Information Processing Terminal 10)

The information processing terminal 10 according to the present embodiment is an information processing device that generates learning data for acquiring a second utterance interpretation result according to the present embodiment based on a result (first utterance interpretation result) of automatic speech recognition and natural language processing performed by the information processing server 20. Further, the information processing terminal 10 according to the present embodiment acquires the second utterance interpretation result based on the learning data, and controls a response to a user's utterance together with the first utterance interpretation result.

Examples of the information processing terminal 10 according to the present embodiment may include a smartphone, a tablet, a personal computer (PC), and a wearable device. Further, the information processing terminal 10 according to the present embodiment may be a dedicated stationary or autonomous mobile terminal.

Note that, in the present disclosure, the information processing terminal 10 may be referred to as a client. Further, in the present disclosure, processing performed by the information processing terminal 10 may be referred to as local-side processing.

(Information Processing Server 20)

The information processing server 20 according to the present embodiment is an information processing device that performs the automatic speech recognition and natural language understanding based on speech data for a user's utterance collected by the information processing terminal 10 and outputs the first utterance interpretation result.

Note that, in the present disclosure, the information processing server 20 may be simply referred to as a server. Further, in the present disclosure, the processing performed by the information processing server 20 may be referred to as cloud-side processing.

(Network 30)

The network 30 has a function of connecting the information processing terminal 10 and the information processing server 20. The network 30 may include a public line network such as the Internet, a telephone line network, or a satellite communication network, various local area networks (LAN) including Ethernet (registered trademark), a wide area network (WAN), and the like. In addition, the network 30 may include a dedicated line network such as an Internet protocol-virtual private network (IP-VPN). Moreover, the network 30 may include a wireless communication network such as Wi-Fi (registered trademark) or Bluetooth (registered trademark).

A configuration example of the information processing system according to the embodiment of the present disclosure has been described above. The configuration described above with reference to FIG. 1 is merely an example, and the configuration of the information processing system according to the present embodiment is not limited to the example. For example, the functions of the information processing terminal 10 and the information processing server 20 according to the present embodiment may be implemented by a single information processing device. In this case, the information processing device may output a first utterance interpretation result and a second utterance interpretation result based on a user's utterance, and may perform a response control based on the both results. The configuration of the information processing system according to the present embodiment can be flexibly modified in accordance with specifications or operation.

1.3. Functional Configuration Example of Information Processing Terminal 10

Figure 2:
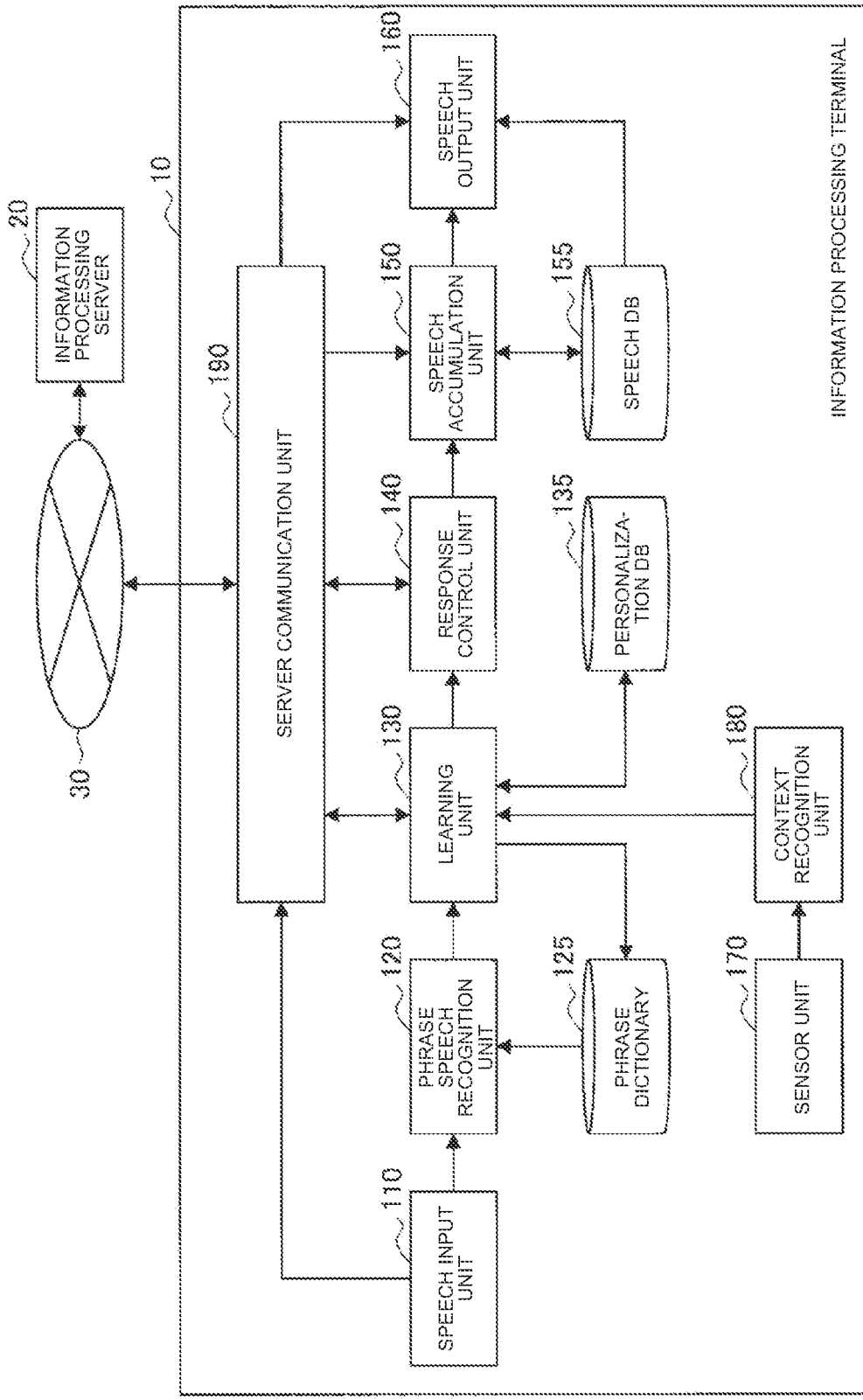
FIG. 2 is a block diagram illustrating a functional configuration example of an information processing terminal according to the embodiment.

Next, a functional configuration example of the information processing terminal 10 according to the embodiment of the present disclosure will be described. FIG. 2 is a block diagram illustrating the functional configuration example of the information processing terminal 10 according to the present embodiment. Referring to FIG. 2, the information processing terminal 10 according to the present embodiment includes a speech input unit 110, a phrase speech recognition unit 120, a phrase dictionary 125, a learning unit 130, a personalization DB 135, the response control unit 140, a speech accumulation unit 150, a speech DB 155, a speech output unit 160, a sensor unit 170, a context recognition unit 180, and a server communication unit 190.

(Speech Input Unit 110)

The speech input unit 110 according to the present embodiment has a function of collecting a sound such as an utterance of the user or an ambient sound generated around the information processing terminal 10. The speech input unit 110 according to the present embodiment includes a microphone for collecting a sound.

(Phrase Speech Recognition Unit 120)

The phrase speech recognition unit 120 according to the present embodiment recognizes a specific phrase included in a user's utterance based on phrases registered in the phrase dictionary 125, and generates an utterance text corresponding to the recognized phrase.

(Phrase Dictionary 125)

The phrase dictionary 125 according to the present embodiment stores the phrase recognized by the phrase speech recognition unit 120. Registration of a phrase in the phrase dictionary 125 according to the present embodiment will be described later.

(Learning Unit 130)

The learning unit according to the present embodiment learns the utterance text generated by the cloud-side processing and a first utterance interpretation result acquired based on the utterance text in association with each other, and stores the utterance text and the first utterance interpretation result as learning data in the personalization DB 135. Further, based on a specific phrase registered in the phrase dictionary 125 being recognized by the phrase speech recognition unit 120, the learning unit 130 according to the present embodiment acquires a second utterance interpretation result corresponding to the recognized phrase from the learning data stored in the personalization DB 135. Details of the function of the learning unit 130 according to the present embodiment will be described later.

(Personalization DB 135)

The personalization DB 135 according to the present embodiment stores the above-described learning data under the control of the learning unit 130.

(Response Control Unit 140)

The response control unit 140 according to the present embodiment controls a response to a user's utterance based on the first utterance interpretation result output by the information processing server 20 and the second utterance interpretation result acquired by the learning unit 130. The response control unit 140 according to the present embodiment controls a response to a user's utterance based on the second utterance interpretation result in a case where the second utterance interpretation result is acquired based on the user's utterance before acquisition of the first utterance interpretation result, which is one of the characteristics. Details of the function of the response control unit 140 according to the present embodiment will be described later.

(Speech Accumulation Unit 150)

The speech accumulation unit 150 according to the present embodiment stores, in the speech DB 155, a synthesized speech synthesized by the information processing server 20.

(Speech DB 155)

The speech DB 155 according to the present embodiment stores the synthesized speech synthesized by the information processing server 20 under the control of the speech accumulation unit 150.

(Speech Output Unit 160)

The speech output unit 160 according to the present embodiment has a function of outputting various sounds including the synthesized speech stored in the speech DB 155. For this purpose, the speech output unit 160 according to the present embodiment includes a sound output device such as a speaker or an amplifier.

(Sensor Unit 170)

The sensor unit 170 according to the present embodiment has a function for collecting various sensor information related to a peripheral environment or user states and actions. The sensor unit 170 includes, for example, an image sensor, an optical sensor including an infrared sensor, an acceleration sensor, a gyro sensor, a geomagnetic sensor, a thermal sensor, a vibration sensor, an image sensor, a global navigation satellite system (GNSS) signal receiving device, or a clock.

(Context Recognition Unit 180)

The context recognition unit 180 according to the present embodiment recognizes a context when the user makes an utterance, based on sensor information collected by the sensor unit 170. The context according to the present embodiment may include, for example, a time or place at which the user makes an utterance, the user who makes an utterance, the age or sex of the user, the state or action of the user, and operating statuses of various devices.

(Server Communication Unit 190)

The server communication unit 190 according to the present embodiment performs information communication with the information processing server 20 via the network 30. For example, the server communication unit 190 receives the utterance text, the first utterance interpretation result, the synthesized speech, and the like, from the information processing server 20. Further, for example, the server communication unit 190 transmits, to the information processing server 20, speech data for a user's utterance acquired by the speech input unit 110, a second utterance interpretation result acquired by the learning unit 130, or the like.

The functional configuration example of the information processing terminal 10 according to the embodiment of the present disclosure has been described above. Note that the above functional configuration described with reference to FIG. 2 is merely an example, and the functional configuration of the information processing terminal 10 according to the present embodiment is not limited to the example. For example, the information processing terminal 10 according to the present embodiment may further include a display unit for displaying visual information, or the like. The functional configuration of the information processing terminal 10 according to the present embodiment can be flexibly modified in accordance with specifications or operation.

1.4. Functional Configuration Example of Information Processing Server 20

Figure 3:
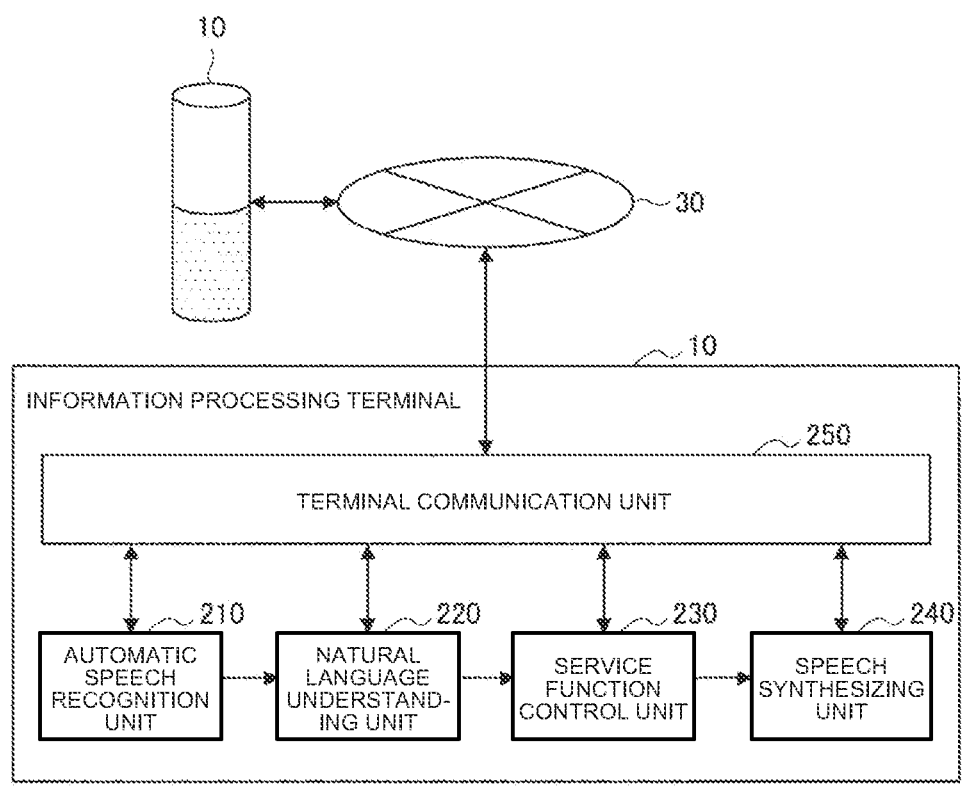
FIG. 3 is a block diagram illustrating a functional configuration example of an information processing server according to the embodiment.

Next, a functional configuration example of the information processing server 20 according to the embodiment of the present disclosure will be described. FIG. 3 is a block diagram illustrating the functional configuration example of the information processing server 20 according to the present embodiment. Referring to FIG. 3, the information processing server 20 according to the present embodiment includes an automatic speech recognition unit 210, a natural language understanding unit 220, a service function control unit 230, a speech synthesizing unit 240, and a terminal communication unit 250.

(Automatic Speech Recognition Unit 210)

The automatic speech recognition unit 210 according to the present embodiment performs automatic speech recognition processing based on speech data transmitted from the information processing terminal 10, and generates an utterance text.

(Natural Language Understanding Unit 220)

The natural language understanding unit 220 according to the present embodiment performs natural language understanding processing based on an utterance text generated by the automatic speech recognition unit 210, and outputs a first utterance interpretation result. The first utterance interpretation result according to the present embodiment includes a user's utterance intent and an entity of the utterance intent.

(Service Function Control Unit 230)

The service function control unit 230 according to the present embodiment controls execution of various service functions on the cloud based on a first utterance interpretation result output by the natural language understanding unit 220, and acquires information to be presented to the user to generate a response text. The service function control unit 230 may also perform the above-described processing in the same manner even in a case where the second utterance interpretation result is received from the information processing terminal 10.

(Speech Synthesizing Unit 240)

The speech synthesizing unit 240 according to the present embodiment synthesizes a speech corresponding to the response text generated by the service function control unit 230. The speech synthesizing unit 240 according to the present embodiment may also perform the above-mentioned processing in the same manner even in a case where the response text is received from the information processing terminal 10.

(Terminal Communication Unit 250)

The terminal communication unit 250 according to the present embodiment performs information communication with the information processing terminal 10 via the network 30. For example, the terminal communication unit 250 receives, from the information processing terminal 10, speech data for a speech uttered by the user, the first utterance interpretation result, the response text, or the like. Further, for example, the terminal communication unit 250 transmits, to the information processing terminal 10, the utterance text generated by the automatic speech recognition unit 210, the first utterance interpretation result output by the natural language understanding unit 220, the synthesized speech synthesized by the speech synthesizing unit 240, and the like.

The functional configuration example of the information processing server 20 according to the embodiment of the present disclosure has been described above. Note that the above functional configuration described with reference to FIG. 3 is merely an example, and the functional configuration of the information processing server 20 according to the present embodiment is not limited to the example. For example, each function described above may be implemented by being distributed to a plurality of devices. The functional configuration of the information processing server 20 according to the present embodiment can be flexibly modified in accordance with specifications or operation.

1.5. Details of Functions

Figure 4:
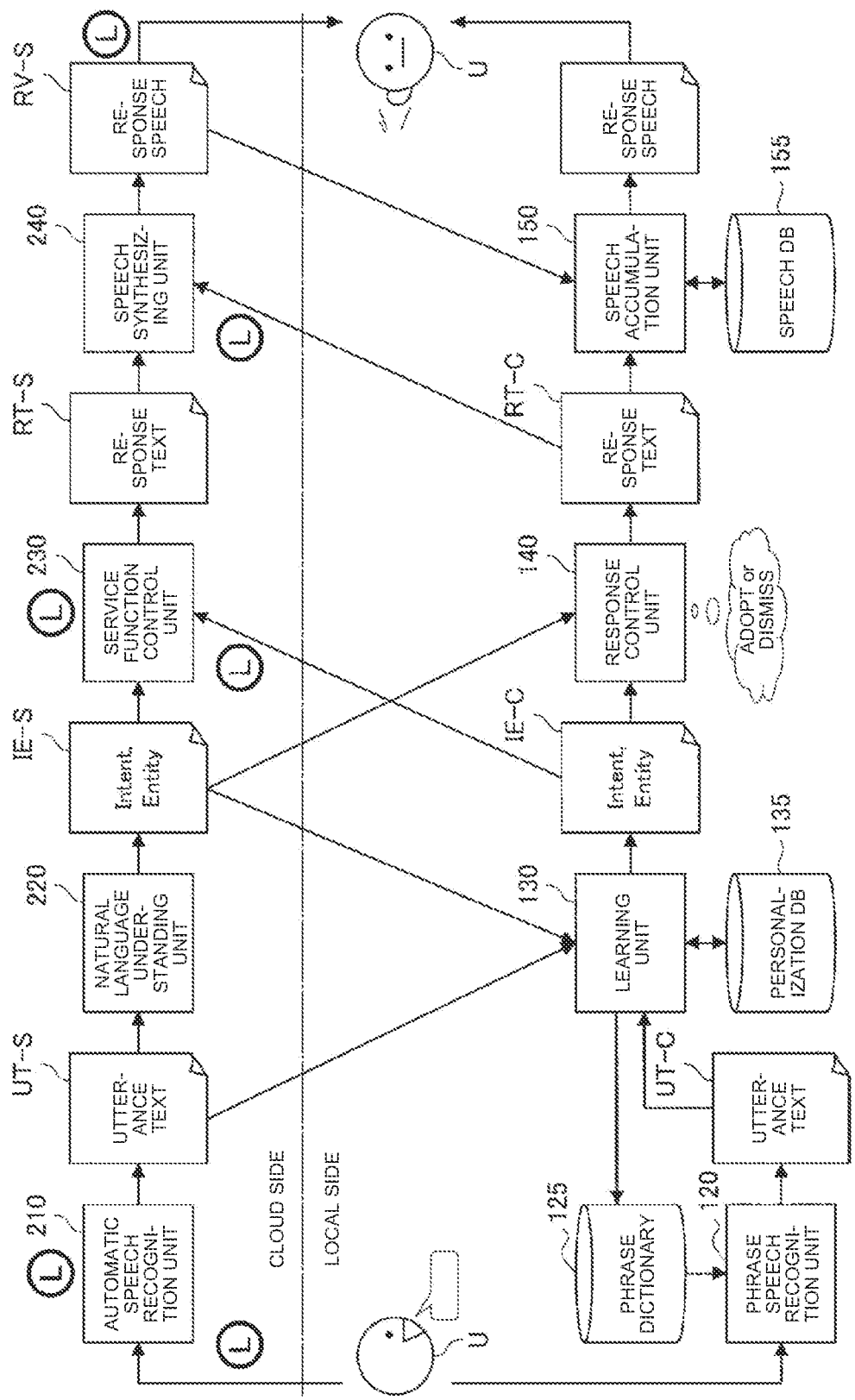
FIG. 4 is a diagram illustrating an outline of a response control performed by the information processing terminal and the information processing server according to the embodiment.

Next, the functions of the information processing terminal 10 and the information processing server 20 according to the present embodiment will be described in detail. FIG. 4 is a diagram illustrating an outline of a response control performed by the information processing terminal 10 and the information processing server 20 according to the present embodiment.

First, the cloud-side processing illustrated in the upper part of FIG. 4 will be described. Once a user U makes an utterance, the speech input unit 110 of the information processing terminal 10 collects speech data for the utterance, and transmits the speech data to the information processing server 20 via the server communication unit 190.

Next, the automatic speech recognition unit 210 of the information processing server 20 performs automatic speech recognition processing based on the received speech data, and generates an utterance text UT-S. The utterance text UT-S is transmitted to the natural language understanding unit 220 and the information processing terminal 10.

Further, the natural language understanding unit 220 performs natural language understanding processing based on the utterance text UT-S generated by the automatic speech recognition unit 210, and outputs a first utterance interpretation result IE-S. As described above, the first utterance interpretation result IE-S includes an utterance intent and an entity. The first utterance interpretation result IE-S can be transmitted to the service function control unit 230 and the information processing terminal 10.

Next, the service function control unit 230 controls execution of various service functions on the cloud based on the first utterance interpretation result output by the natural language understanding unit 220, and generates a response text RT-S. Note that the service function control unit 230 may generate the response text RT-S based on a second utterance interpretation result IE-C received from the information processing terminal 10.

Next, the speech synthesizing unit 240 synthesizes a response speech RV-S based on the response text RT-S generated by the service function control unit 230. Note that the speech synthesizing unit 240 may synthesize the response speech RV-S based on a response text RT-C received from the information processing terminal 10. The response speech RV-S synthesized by the speech synthesizing unit 240 is transmitted to the information processing terminal 10 and output by the speech output unit 160.

Next, the local-side processing illustrated in the lower part of FIG. 4 will be described. The speech data collected by the speech input unit 110 is transmitted to the information processing server 20 as described above and is also input to the phrase speech recognition unit 120.

The phrase speech recognition unit 120 uses the phrase dictionary 125 to perform phrase speech recognition processing on the input speech data. Here, in a case where the phrase registered in the phrase dictionary 125 matches the speech data, an utterance text UT-C is generated. The phrase speech recognition unit 120 can generate the utterance text UT-C at a higher speed than the automatic speech recognition processing by performing phrase speech recognition limited to the phrases registered in the phrase dictionary 125.

Further, the learning unit 130 acquires the second utterance interpretation result IE-C by retrieving learning data stored in the personalization DB 135 using the utterance text UT-C generated as described above. Here, the learning data according to the present embodiment may be data in which the utterance text UT-S generated by the information processing server 20 and the first utterance interpretation result IE-S are associated with each other. That is, the learning unit 130 can acquire the second utterance interpretation result IE-C based on past results of automatic speech recognition and natural language understanding performed by the information processing server 20. With the above-described function of the learning unit 130 according to the present embodiment, it is possible to acquire an utterance intent and an entity of an utterance without performing natural language understanding processing on the utterance every time, thereby making it possible to greatly reduce a time required to acquire the utterance intent.

Note that personalization data stored in the personalization DB 135 according to the present embodiment and the phrase registered in the phrase dictionary 125 are dynamically updated by a learning flow to be described later.

Further, the second utterance interpretation result IE-C acquired by the learning unit 130 is transmitted to the information processing server 20 in a case where the utterance intent is related to the use of the service function on the cloud, and the above-described processing is performed. On the other hand, in a case where the utterance intent is local function operation, the second utterance interpretation result IE-C is input to the response control unit 140.

Here, the response control unit 140 performs a response control based on the second utterance interpretation result IE-C, and generates the response text RT-C corresponding to information to be presented to the user before and after the response control.

Here, in a case where a response speech corresponding to the response text RT-C is stored in the speech DB 155, the speech accumulation unit 150 acquires the response speech from the speech DB 155 and causes the speech output unit 160 to output the response speech.

The speech DB 155 functions as a cache of a synthesized speech synthesized by the speech synthesizing unit 240 of the information processing server 20. The speech accumulation unit 150 stores the response speech RV-S that is frequently synthesized by the speech synthesizing unit 240 (that is, frequently used for response) in the speech DB 155, such that the speech output unit 160 can output the response speech without waiting for speech synthesis performed by the speech synthesizing unit 240 every time. With such a configuration, it is possible to eliminate a time required for speech synthesis and effectively reduce a response time to a user's utterance. Note that the speech accumulation unit 150 may delete a response speech whose output frequency is decreased from the speech DB 155.

The outline of the response control performed by the information processing terminal 10 and the information processing server 20 has been described above. Note that, among the above-described processings, a delay due to network transmission occurs in the processing in which information communication is performed between the information processing terminal 10 and the information processing server 20 via the network 30, which causes a decrease in interaction response.

Further, since the automatic speech recognition processing performed by the automatic speech recognition unit 210 of the information processing server 20 supports various utterances, a long determination time is taken to determine the end of an utterance, and thus the processing causes a decrease in interaction response. On the other hand, in the information processing terminal 10 according to the present embodiment, the more the user uses the system, the more data is accumulated in the phrase dictionary 125, the personalization DB 135, and the speech DB 155, and the number of processings that can be performed on the local side is increased. As a result, the delay described above is reduced, and it is possible to effectively reduce the response time. Note that, in FIG. 4, the delay described above is indicated by a circled "L".

Next, personalized learning according to the present embodiment will be described with a specific example. FIGS. 5A, 5B, 5C, 5D, 5E, 5F, 5G, 5H, and 5I are diagrams for describing the personalized learning according to the present embodiment.

Figure 5A:
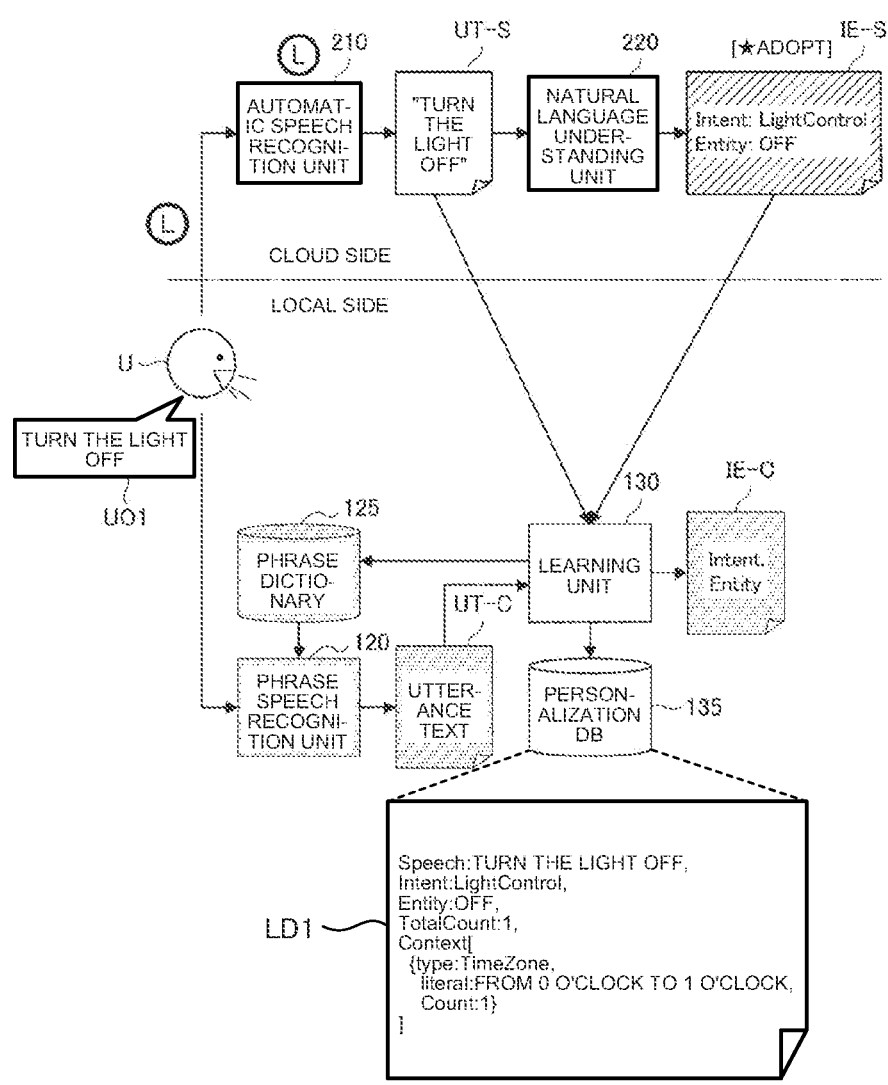
FIG. 5A is a diagram for describing personalized learning according to the embodiment.

FIG. 5A illustrates an example of a response control in a case where phrase registration in the phrase dictionary 125 is not performed and storing of learning data in the personalization DB 135 is not performed.

Here, since a phrase corresponding to an utterance UO1 of the user U is not yet registered in the phrase dictionary 125, the phrase speech recognition unit 120 cannot generate the utterance text UT-C, and the learning unit 130 also cannot acquire the second utterance interpretation result IE-C based on the utterance text UT-C.

Therefore, the response control unit 140 adopts the first utterance interpretation result IE-S output by the cloud-side processing, and controls a response to the utterance UO1 based on the first utterance interpretation result IE-S. In a case of the example illustrated in FIG. 5A, the response control unit 140 controls turning off of a light based on the first utterance interpretation result IE-S. Here, the response control unit 140 may indirectly control the turning off of the light by instructing the service function control unit 230.

Further, the learning unit 130 according to the present embodiment learns the utterance text UT-S generated by the cloud-side processing and the first utterance interpretation result IE-S in association with each other, and the utterance text UT-S and the first utterance interpretation result IE-S are stored as learning data LD1 in the personalization DB 135. Here, the learning unit 130 includes, in the learning data, the number of times of acquisition of the same first utterance interpretation result based on the same utterance text UT-S (that is, the number of times by which the utterance UO1 ("turn off the light") is interpreted to have an utterance intent of "LightControl", and an entity of "OFF"), and a context acquired at the time of recognition of the utterance UO1. In addition, the learning unit 130 increments the number of times of acquisition included in a corresponding learning data each time the first utterance interpretation result is acquired.

Figure 5B:
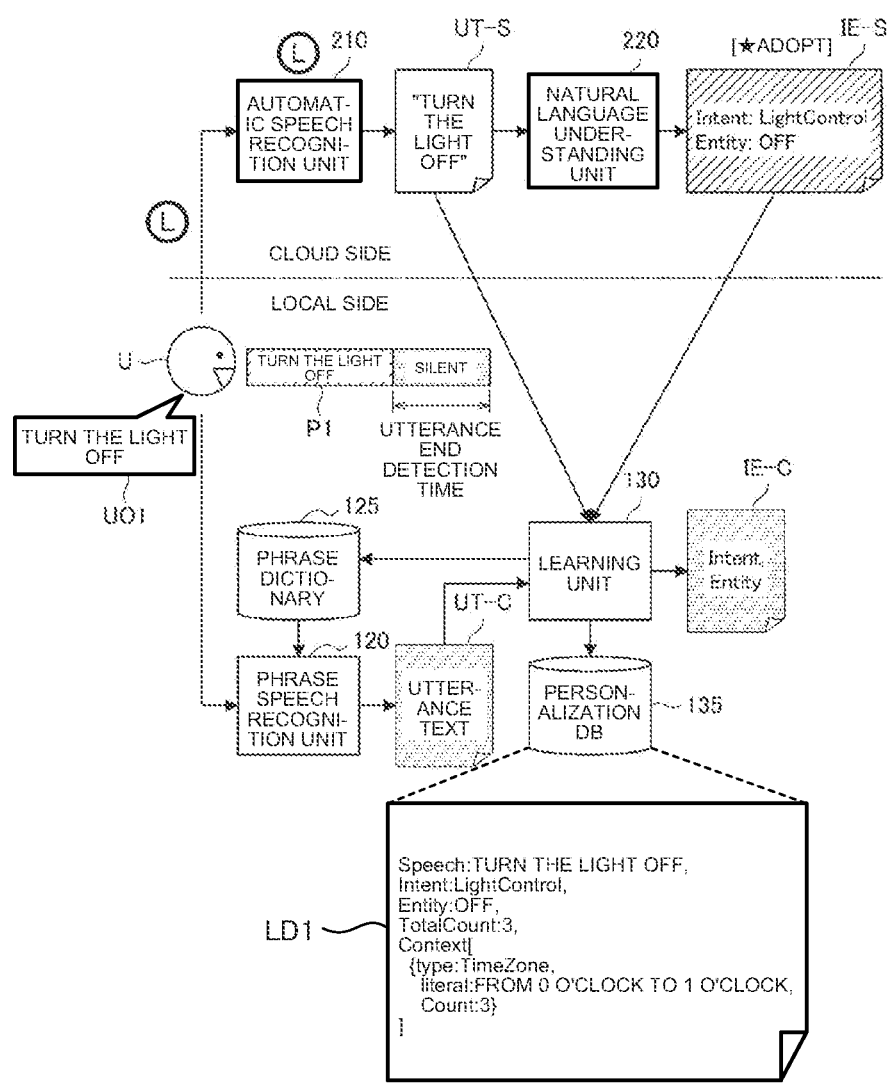
FIG. 5B is a diagram for describing personalized learning according to the embodiment.

Next, the description will be continued with reference to FIG. 5B. FIG. 5B illustrates an example of a response control in a case where the number of times of acquisition of the first utterance interpretation result based on the utterance UO1 ("turn off the light") is equal to or more than a predetermined threshold value.

In a case where the number of times of acquisition is accumulated and reaches the predetermined threshold value (for example, three times) or more, the learning unit 130 registers, in the phrase dictionary 125, a phrase P1 ("turn off the light") corresponding to the utterance text UT-S generated by the cloud-side processing.

With the above-described function of the learning unit 130 according to the present embodiment, from then on (from the fourth acquisition), the phrase speech recognition unit 120 can recognize the utterance UO1 based on the phrase P1 ("turn off the light") registered in the phrase dictionary 125 when the user U makes the utterance UO1: "turn off the light".

Here, the learning unit 130 may register an utterance end detection time for the phrase P1 in the phrase dictionary 125 together with the phrase P1. In a case of the example illustrated in FIG. 5B, the learning unit 130 sets the utterance end detection time of the phrase P1 to 1.5 seconds.

In the above description, a case where the learning unit 130 performs phrase registration in the phrase dictionary 125 based on the number of times of acquisition has been described. However, the learning unit 130 according to the present embodiment may also perform phrase registration based on, for example, a user's explicit indication. For example, the user may be able to cause the learning unit 130 to perform the phrase registration described above by making an utterance such as "remember this one" after making an arbitrary utterance. See Japanese Patent Application No. 2018-5061 filed by the applicant of the present disclosure for an example of indication by the user according to the present embodiment.

Figure 5C:
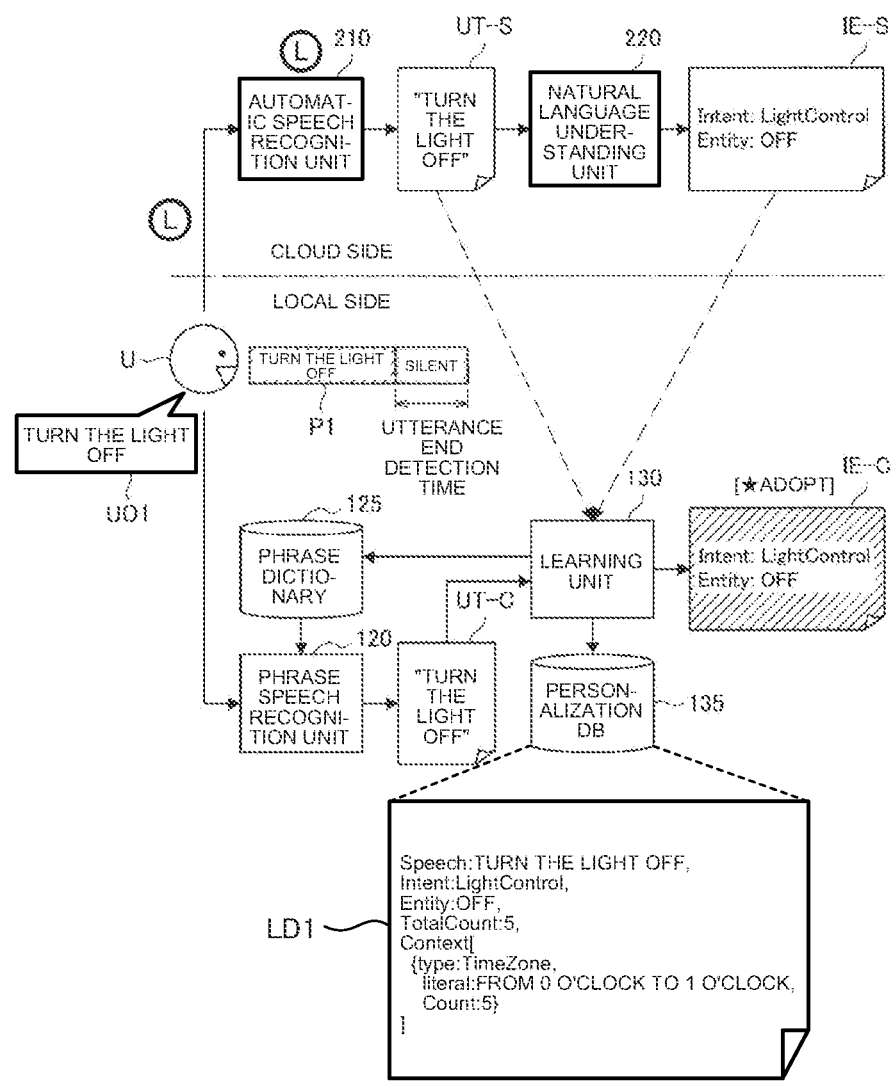
FIG. 5C is a diagram for describing personalized learning according to the embodiment.
Figure 5D:
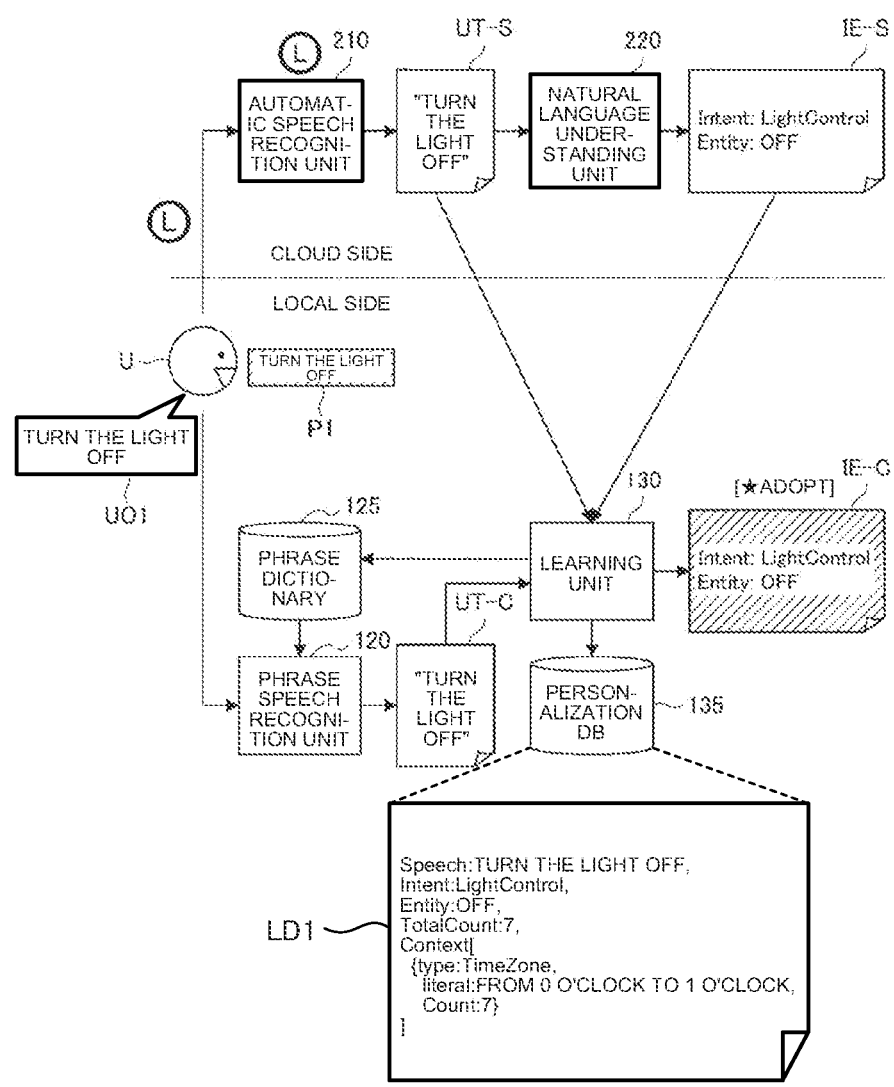
FIG. 5D is a diagram for describing personalized learning according to the embodiment.

Next, the description will be continued with reference to FIG. 5C. FIG. 5C illustrates an example of a response control in a case where the number of times of acquisition is further increased (for example, five times) after the phrase P1 ("turn off the light") is registered in the phrase dictionary.

In the example illustrated in FIG. 5C, the phrase speech recognition unit 120 recognizes the utterance UO1 and generates the utterance text UT-C based on the phrase P1 registered in the phrase dictionary 125 at the stage illustrated in FIG. 5B. Further, the learning unit 130 retrieves the learning data registered in the personalization DB 135 based on the utterance text UT-C, and outputs the second utterance interpretation result IE-C including the utterance intent of "LightControl" and the entity of "OFF".

Here, the second utterance interpretation result IE-C is acquired before the acquisition of the first utterance interpretation result IE-S with the delay as described above. Therefore, the response control unit 140 according to the present embodiment can adopt the second utterance interpretation result IE-C acquired before the acquisition of the first utterance interpretation result IE-S, and control a response to the user's utterance based on the second utterance interpretation result IE-C.

Further, the learning unit 130 may reduce the utterance end detection time for the phrase registered in the phrase dictionary 125 as the number of times of acquisition is increased. Comparing FIGS. 5B and 5C, it can be seen that the utterance end detection time for the phrase P1 is reduced as the number of times of acquisition is increased from 3 to 5.

With the above-described function of the learning unit 130 according to the present embodiment, as the number of times of acquisition of an interpretation result based on a phrase frequently uttered by the user is increased, the utterance end detection time is reduced, thereby making it possible to effectively reduce a response time to an utterance.

The learning unit 130 according to the present embodiment may perform utterance end detection time reducing processing until the length of the utterance end detection time becomes 0 (second). In a case of the example illustrated in FIG. 5D, as the number of times of acquisition becomes seven, the utterance end detection time for the phrase P1 is 0.

In addition, in a case where the number of times of acquisition is further increased after the length of the utterance end detection time becomes 0, the learning unit 130 according to the present embodiment may newly register, in the phrase dictionary 125, a short phrase that does not include a part of the phrase registered in the phrase dictionary 125. Here, the learning unit 130 according to the present embodiment stores, in the personalization DB 135, new learning data for the short phrase, in addition to the learning data for the original phrase, the first utterance interpretation result (utterance intent and entity), the number of times of acquisition, and the context.

Figure 5E:
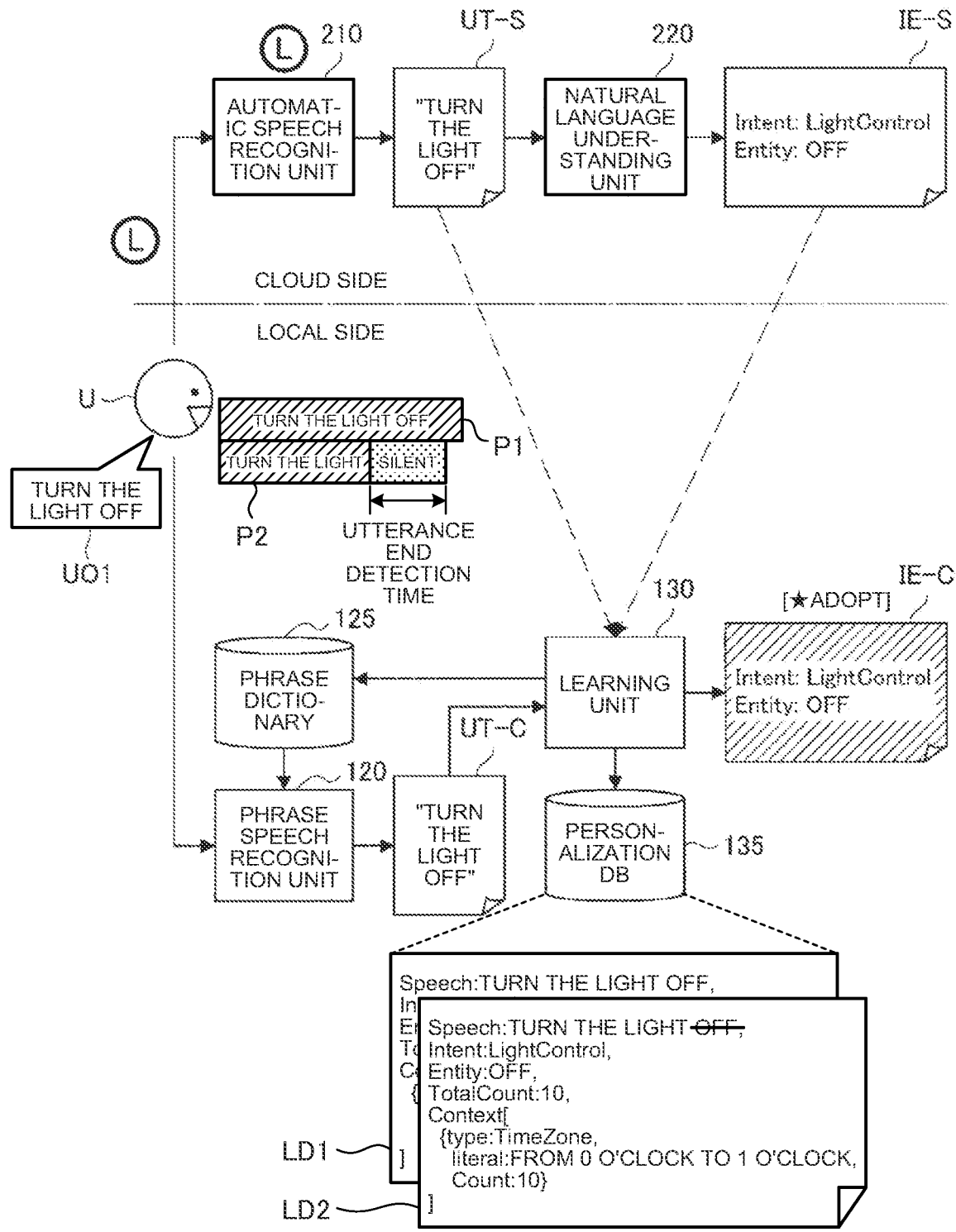
FIG. 5E is a diagram for describing personalized learning according to the embodiment.

In a case of the example illustrated in FIG. 5E, the learning unit 130 newly registers, in the phrase dictionary 125, a short phrase P2 ("Turn the light") that does not include a part (the last one segment) the ending of the phrase P1 based on the fact that the number of times of acquisition is further increased after the length of the utterance end detection time for the phrase P1 becomes 0. Here, the learning unit 130 registers an utterance end detection time for the short phrase P2 in the phrase dictionary 125 together with the short phrase P2.

Further, the learning unit 130 registers, in the personalization DB 135, new learning data LD2 for the short phrase P2 that takes over the first utterance interpretation result, the number of times of acquisition, and the context from the learning data LD1 for the phrase P1.

Figure 5F:
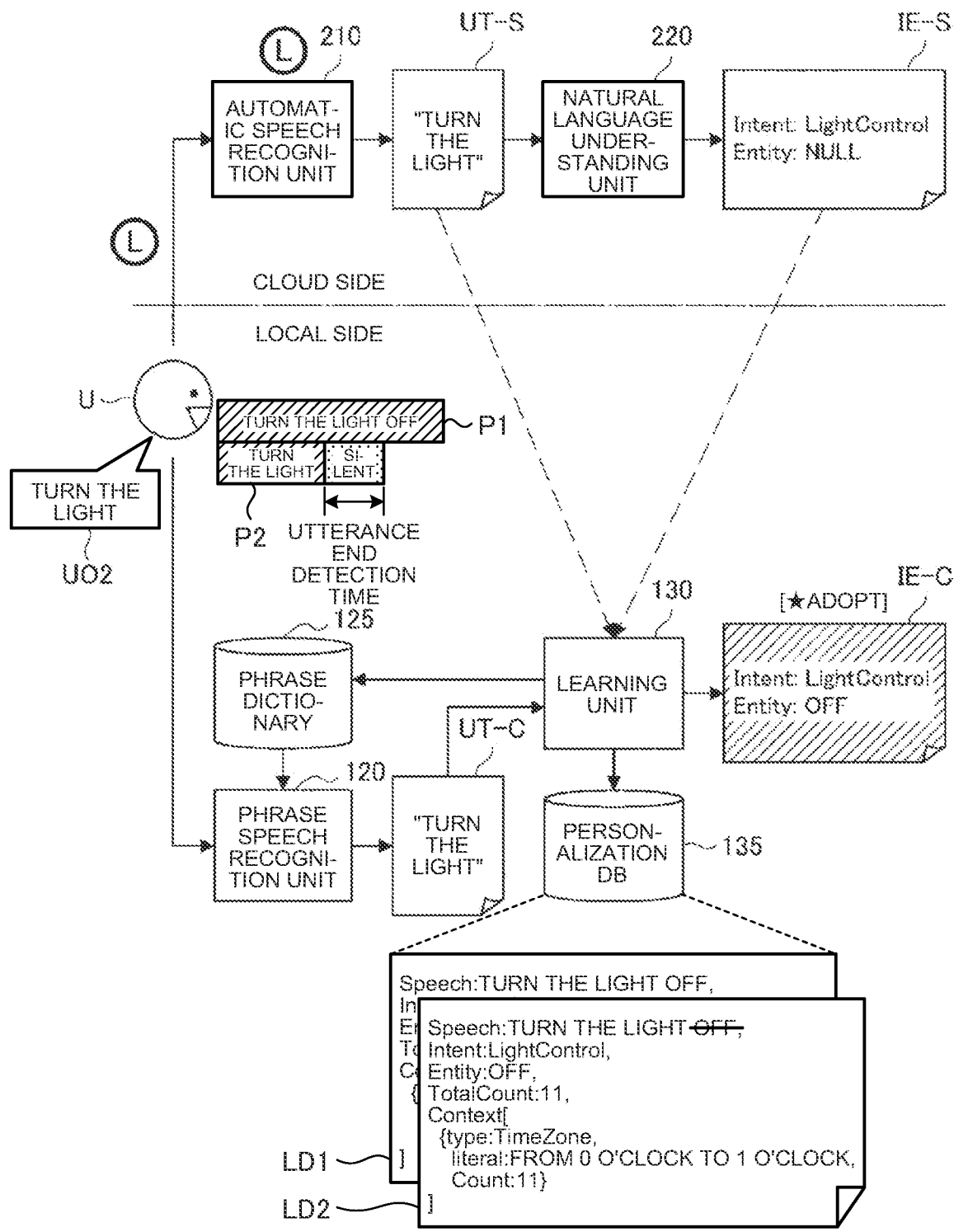
FIG. 5F is a diagram for describing personalized learning according to the embodiment.

With the function of the learning unit 130 according to the present embodiment, even when the user U makes an utterance UO2 of "Turn the light" as illustrated in FIG. 5F after the short phrase P2 is registered, it is possible to acquire the same utterance intent and entity as those of the utterance UO1 ("Turn the light off"), thereby making it possible to further reduce a response time to an utterance and improve convenience of a user.

Further, the learning unit 130 may reduce the utterance end detection time for the short phrase to a predetermined length (longer than 0 seconds) as the number of times of recognition of the short phrase is increased. With the above-described function of the learning unit 130 according to the present embodiment, it is possible to further reduce a response time.

Figure 5G:
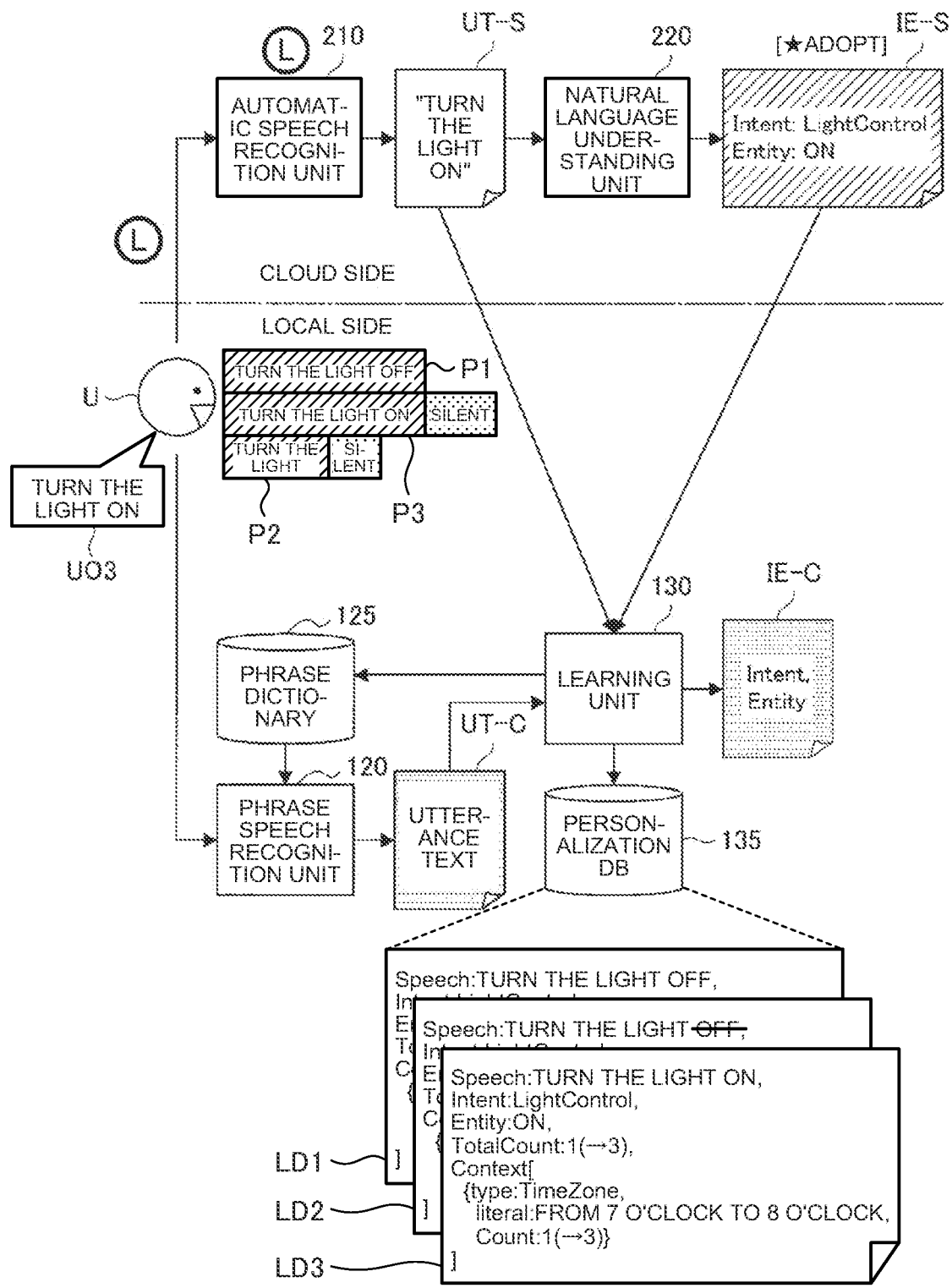
FIG. 5G is a diagram for describing personalized learning according to the embodiment.

In addition, FIG. 5G illustrates an example of a response control in a case where the user U makes an utterance UO3 of "Turn the light on" three times after the registration of the short phrase P2.

Here, similarly to a case of the utterance UO1 ("Turn the light off"), the learning unit 130 according to the present embodiment registers a phrase P3 ("Turn the light on") corresponding to the utterance UO3 in the phrase dictionary 125 together with an utterance end detection time. Further, the learning unit 130 newly stores, in the personalization DB 135, learning data LD3 corresponding to the utterance UO3.

Even in this case, the learning unit 130 can correctly determine whether the utterance of the user is "Turn the light" or "Turn the light on" based on the phoneme "o" that follows "Turn the light" by setting the length of the utterance end detection time for the short phrase P2 registered in advance to other than 0

Figure 5H:
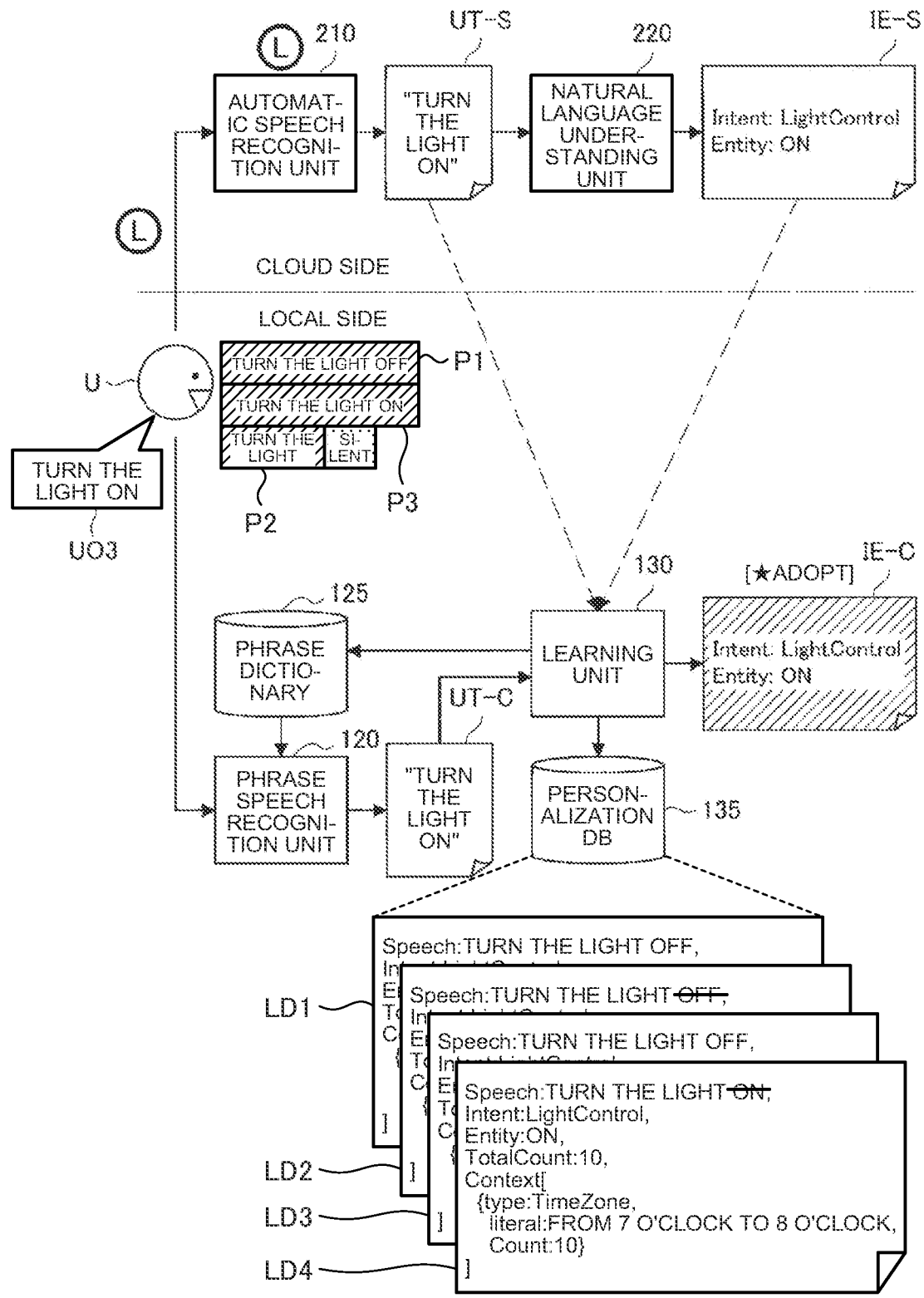
FIG. 5H is a diagram for describing personalized learning according to the embodiment.

In addition, when the number of times of acquisition is increased after the registration of the phrase P3, the length of the utterance end detection time for the phrase P3 becomes 0 as illustrated in FIG. 5H similarly to the phrase P1, and new learning data LD4 corresponding to the short phrase ("Turn the light") of "Turn the light on" is registered in the personalization DB 135 similarly to a case of "Turn the light off".

Here, when the user U utters only "Turn the light", the learning unit 130 cannot specify corresponding learning data from only the utterance. Therefore, in a case where a plurality of second utterance interpretation results can be acquired based on an utterance of a user, the learning unit 130 according to the present embodiment may specify a correct second utterance interpretation result based on similarity between a context acquired when the utterance is made, and a context stored together with the learning data to perform a response control.

Figure 5I:
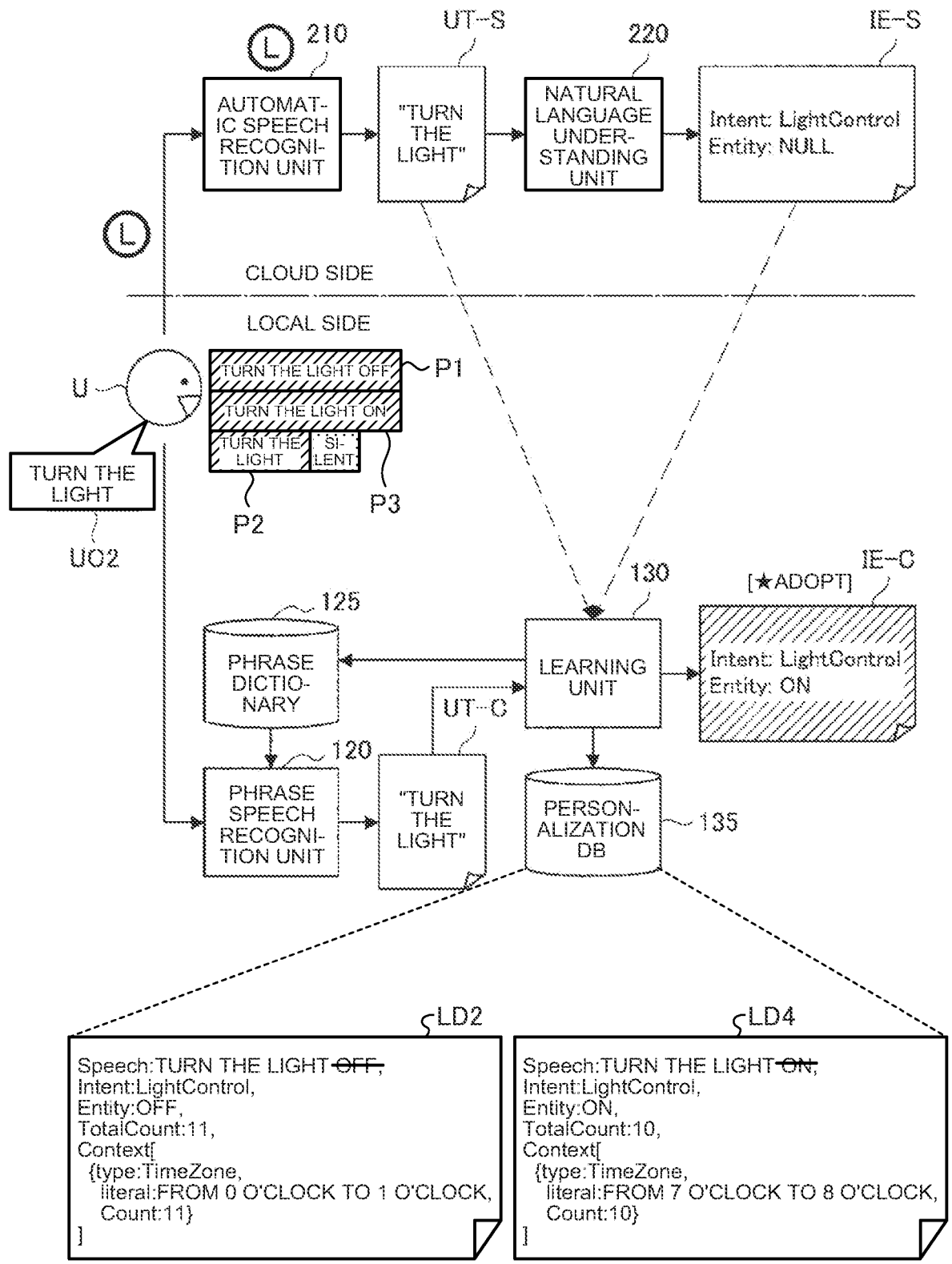
FIG. 5I is a diagram for describing personalized learning according to the embodiment.

For example, in a case of the example illustrated in FIG. 5I, the personalization DB 135 stores two learning data LD2 and LD4 corresponding to the short phrase P2 ("Turn the light"). However, a stored context is different for the learning data LD2 and LD4.

For example, focusing on the learning data LD2 and LD4, it can be seen that the utterance ("Turn the light") corresponding to the utterance intent of "LightControl" and the entity of "OFF" is often recognized from 0 o'clock to 1 o'clock, while the utterance ("Turn the light") corresponding to the utterance intent of "LightControl" and the entity of "ON" is often recognized from 7 o'clock to 8 o'clock.

Here, the learning unit 130 according to the present embodiment can specify correct learning data corresponding to the utterance UO2 ("Turn the light") based on a context recognized by the context recognition unit 180 when the utterance UO2 ("Turn the light") is recognized.

For example, in a case where the utterance UO2 is recognized at a time close to 0 o'clock, the learning unit 130 can acquire a second utterance interpretation result including the entity of "OFF" based on the learning data LD2 including a similar context. On the other hand, in a case where the utterance UO2 is recognized at a time close to 7 o'clock, the learning unit 130 can acquire a second utterance interpretation result including the entity of "ON" based on the learning data LD4 including a similar context.

As described above, with the learning unit 130 according to the present embodiment, it is possible to implement a highly accurate response control by acquiring the second utterance interpretation result in consideration of the context.

Here, the acquisition of the second utterance interpretation result based on the context according to the present embodiment will be described in detail. As described above, in a case where a plurality of second utterance interpretation results can be acquired from the short phrase, for example, the learning unit 130 may calculate likelihood of a context condition included in learning data, and acquire a correct second utterance interpretation result based on the likelihood.

The likelihood of the context condition can be calculated, for example, by the following Equation (1).

$$L(I|\vec{C}) = \sum_i P(C_i|I) = \sum_i \left(\frac{N_{C_i}}{N_I}\right) \quad (1)$$

The elements in Equation (1) indicate the following, respectively.

$\vec{C}$ (right pointing arrow on C): context vector
I: utterance intent+entity
$L(I|\vec{C})$: likelihood of I at $\vec{C}$ observation
$C_i$: context element
$P(C_i|I)$: probability that $C_i$ was observed under I condition in the past
$N_I$: the number of times of I observation in the past
$N_{C_i}$: the number of times of observation of $C_i$ under I condition in the past Here, the learning unit 130 according to the present embodiment may acquire, as the second utterance interpretation result, I with the highest likelihood $L(I|\vec{C})$ in a complex situation $\vec{C}$.

Figure 6A:
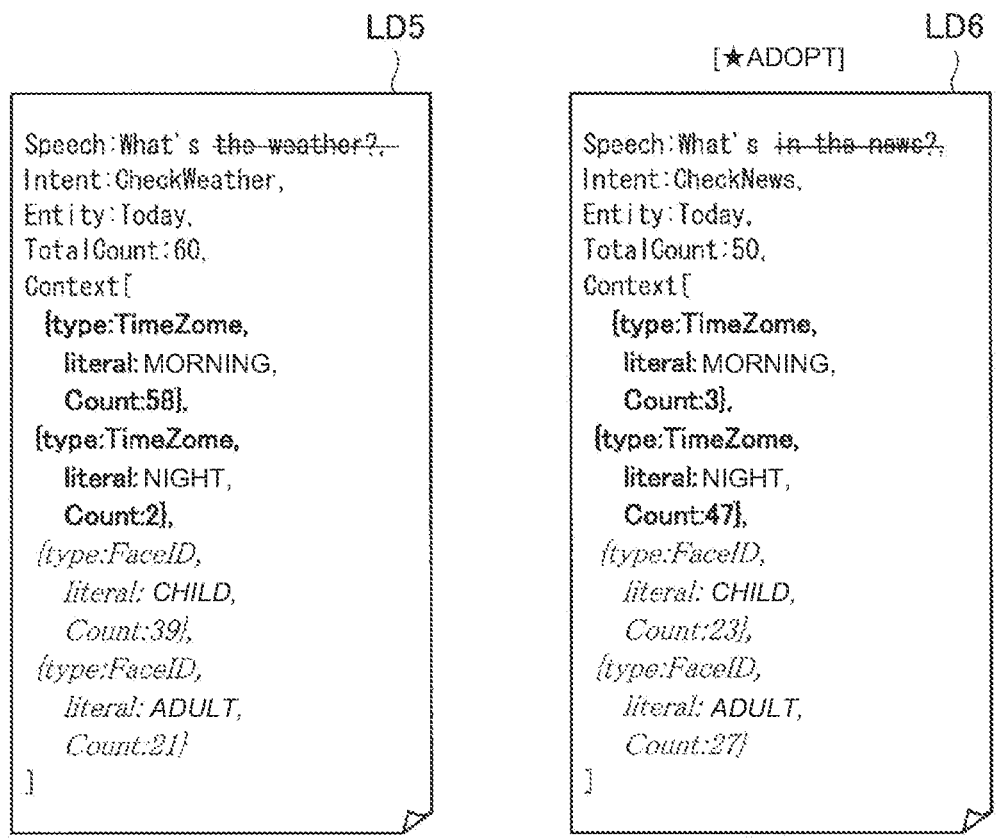
FIG. 6A is a diagram illustrating an example of acquisition of a second utterance interpretation result based on likelihood of a context condition according to the embodiment.
Figure 6B:
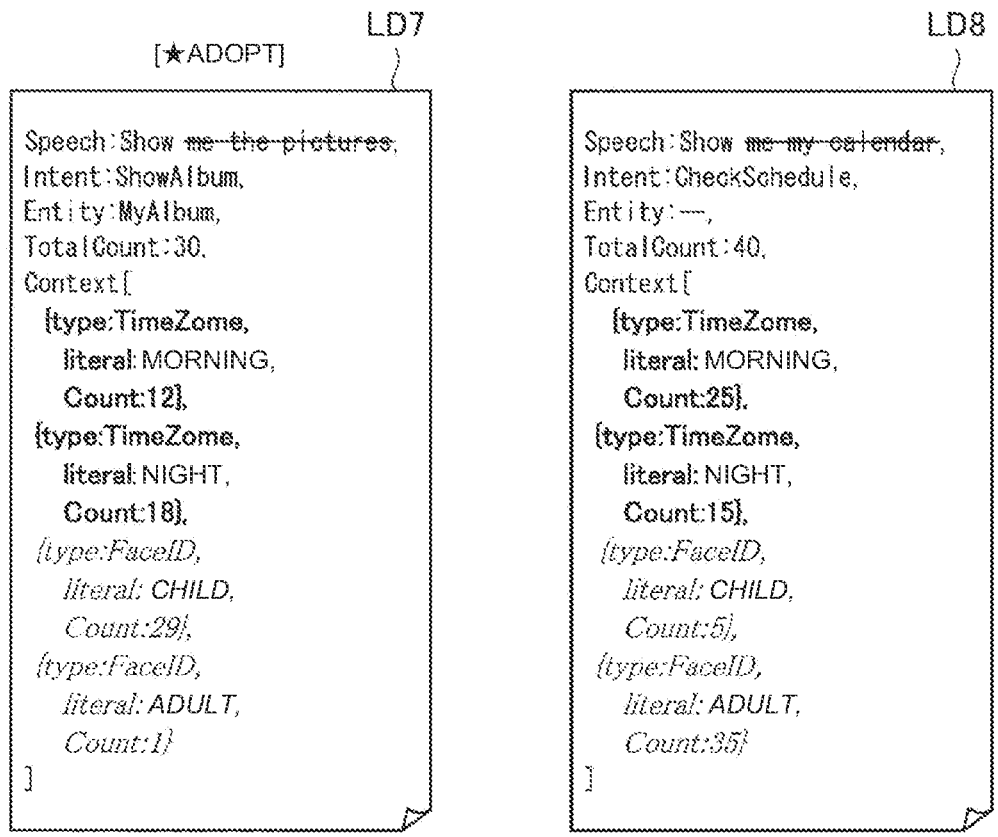
FIG. 6B is a diagram illustrating an example of acquisition of a second utterance interpretation result based on likelihood of a context condition according to the embodiment.

FIGS. 6A and 6B are diagrams each illustrating an example of acquisition of a second utterance interpretation result based on likelihood of a context condition according to the present embodiment.

FIG. 6A illustrates learning data LD5 corresponding to a short phrase of "What's" newly registered based on a phrase "What's the weather?" and learning data LD5 corresponding to a short phrase of "What's" newly registered based on a phrase "What's in the news?".

Focusing on the learning data LD5 and LD6, it can be seen that the short phrase "What's" corresponding to an utterance intent of "CheckWeather" is often uttered by a child user in the morning, and the short phrase "What's" corresponding to an utterance intent of "CheckNews" is often uttered by an adult user at night.

Further, likelihood $L(I|\vec{C})$ calculated when "Timezone=night" and "FaceID=child" are observed as a complex situation $\vec{C}$ is illustrated below each of the learning data LD5 and LD6.

Comparing these two here, a context of Timezone is highly influential, and a result of reflecting the context as a difference of the likelihood indicates that the likelihood $L(I|\vec{C})$ of the learning data LD6 is higher. Therefore, the learning unit 130 may acquire a second utterance interpretation result including the utterance intent of "CheckNews" associated with the learning data LD6.

FIG. 6B illustrates learning data LD7 corresponding to a short phrase of "Show" newly registered based on a phrase of "Show me the pictures" and learning data LD8 corresponding to a short phrase of "Show" newly registered based on a phrase of "Show me my calendar".

Focusing on the learning data LD7 and LD8, it can be seen that the short phrase "Show" corresponding to an utterance intent of "ShowAlbum" is often uttered by a child user regardless of a timezone, and the short phrase "Show" corresponding to an utterance intent of "CheckSchedule" is often uttered by an adult user in the morning.

Further, likelihood $L(I|\vec{C})$ calculated when "Timezone=night" and "FaceID=child" are observed as a complex situation $\vec{C}$ is illustrated below each of the learning data LD7 and LD8.

Comparing these two here, a context of FaceID is highly influential, and a result of reflecting the context as a difference of the likelihood indicates that the likelihood $L(I|\vec{C})$ of the learning data LD7 is higher. Therefore, the learning unit 130 may acquire a second utterance interpretation result including the utterance intent of "ShowAlbum" of the learning data LD7.

As described above, with the learning unit 130 according to the present embodiment, it is possible to calculate a highly accurate likelihood even in a case where the number of types of contexts and the number of literals are large, and the more influential the context is, the more the context is reflected as the difference of the likelihood.

Here, an example of another learning data registered in the personalization DB 135 is illustrated.

Figure 7A:
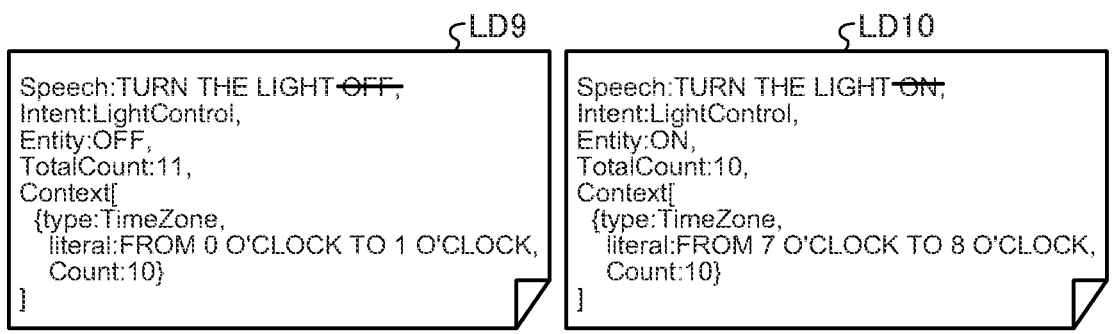
FIG. 7A is a diagram illustrating an example of another learning data registered in a personalization DB 135 according to the embodiment.

For example, FIG. 7A illustrates two learning data LD9 and LD10 having the same utterance intent and different entities as illustrated in FIGS. 5A, 5B 5C 5D, 5E, 5F, 5G, 5H, and 5I. As described above, even in a case where only the entities are different, the learning unit 130 can acquire a correct second utterance interpretation result by calculating likelihood of a context condition, similarly to a case where the utterance intents are different as illustrated in FIGS. 6A and 6B.

Further, FIG. 7B illustrates learning data LD11 corresponding to a short phrase that does not include the last two segments of an original phrase. As described above, in a case where the original phrase is composed of three or more segments, the learning unit 130 according to the present embodiment may store, in the personalization DB 135, learning data in which the sentences are sequentially deleted from the last segment according to the number of times of acquisition.

Further, FIG. 8A illustrates learning data LD12 and LD13 stored together with a plurality of contexts having an inclusive relationship.

In the example illustrated in FIG. 8A, a context of FaceID includes a context of ChildID. Even in this case, the learning unit 130 according to the present embodiment can correctly reflect, as a difference of likelihood, ChildID that is highly influential by performing the likelihood calculation using Equation (1) described above. In a case of the example illustrated in FIG. 8A, the learning unit 130 calculates likelihood of a context when there is the eldest son.

As described above, the likelihood calculation according to the present embodiment is effective even in a case where a plurality of contexts having an inclusive relationship can be observed.

Figure 8B:
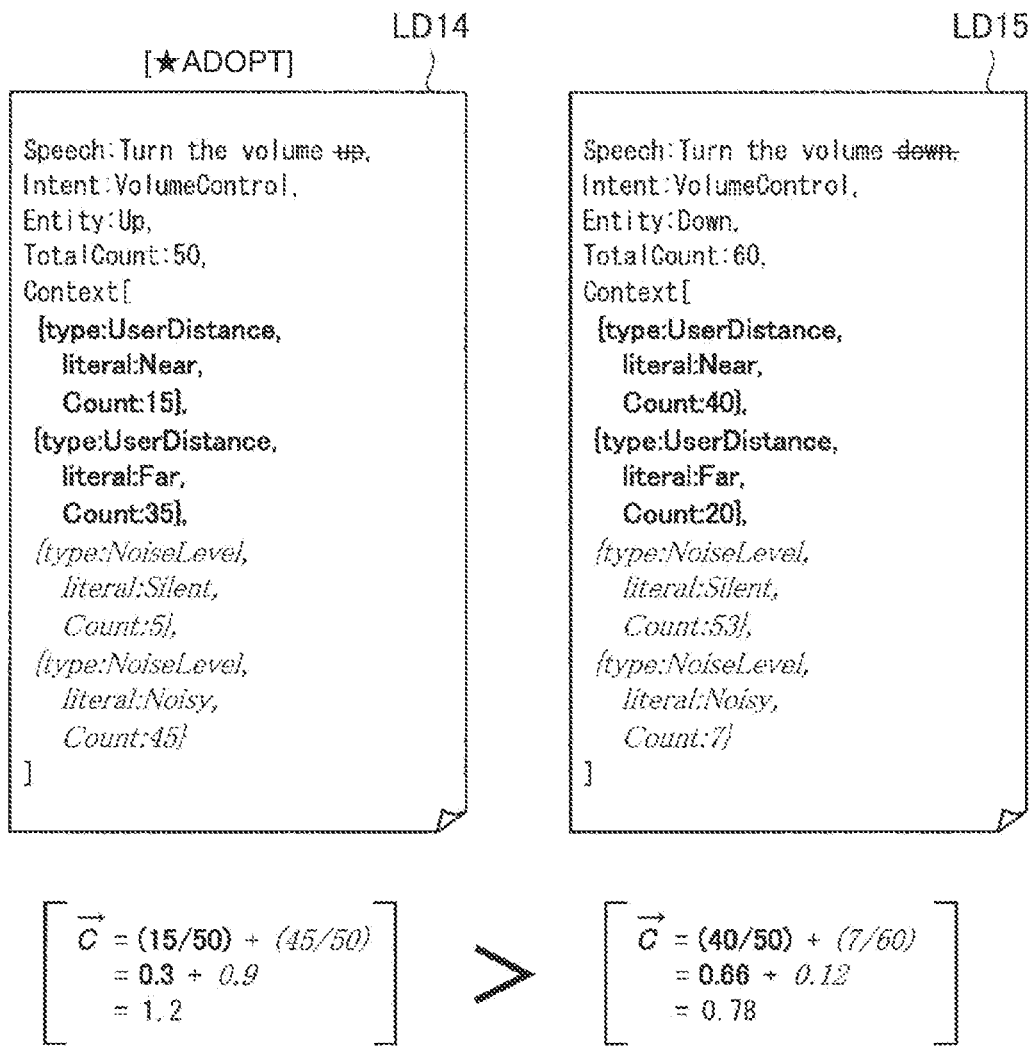
FIG. 8B is a diagram illustrating an example of another learning data registered in the personalization DB 135 according to the embodiment.

Further, FIG. 8B is a diagram illustrating an example in which a plurality of contexts influence acquisition of a second utterance interpretation result.

FIG. 8B illustrates learning data LD14 corresponding to a short phrase "Turn the volume" newly registered based on a phrase "Turn the volume up" and learning data LD15 corresponding to a short phrase "Turn the volume" newly registered based on a phrase "Turn the volume down".

Further, the learning data LD14 and LD15 include a context of UserDistance indicating a distance between the user and the information processing terminal 10 and a context of NoiseLevel indicating a surrounding noise level.

Here, generally, it is predicted that the longer the distance from the information processing terminal 10 is, or the higher the surrounding noise level is, the higher the probability that the user turns the volume up is. On the contrary, the shorter the distance from the information processing terminal 10 is, or the lower the surrounding noise level is, the lower the probability that the user turns the volume down is.

However, for example, a case where the context of UserDistance indicating the distance from the information processing terminal 10 is highly influential for a certain user, and the context of NoiseLevel indicating the surrounding noise level is highly influential for another user is also assumed.

Even in such a case, the learning unit 130 according to the present embodiment can specify a highly influential context for each user by performing the likelihood calculation as illustrated based on the number of times of acquisition of a context, and can acquire a correct second utterance interpretation result based on the context.

For example, in a case of the example illustrated in FIG. 8B, the learning unit 130 calculates each likelihood L(I|C→) in a case where "UserDistance=Near" and "NoiseLevel=Noisy" are observed as a complex situation C→. According to the above-described likelihood calculation performed by the learning unit 130, it can be estimated that the noise level is more influential for the user.

The personalized learning according to the present embodiment and the acquisition of the second utterance interpretation result based on the learning data have been described above. With the above-described functions of the information processing terminal 10 according to the present embodiment, it is possible to perform most of the processings for voice interaction on the local side, and it is possible to greatly reduce a response time to a user's utterance.

Next, a connecting system utterance according to the present embodiment will be described. As described above, the information processing terminal 10 according to the present embodiment can acquire an utterance intent and entity at a high speed by performing learning based on a first utterance interpretation result output as a result of the cloud-side processing.

Here, in a case where a second utterance interpretation result including an incorrect utterance intent and entity is acquired, a function that the user does not intend to execute is executed, which results in a decrease in user satisfaction.

Therefore, when a second utterance interpretation result is acquired, the response control unit 140 according to the present embodiment may cause the speech output unit 160 to output a connecting system utterance before a response control, and may finally determine a content of a response based on a first utterance interpretation result acquired on the cloud side during the output of the connecting system utterance.

Here, the response control unit 140 may determine the length of the connecting system utterance based on a recovery cost for recovering a result of the response based on the acquired second utterance interpretation result.

For example, when the response based on the second utterance interpretation result is related to content viewing, a recovery cost for the response is predicted to be low even in a case where an incorrect content is output.

Therefore, in a case of a response with a low recovery cost for the response based on the second utterance interpretation result, such as content viewing, the learning unit 130 according to the present embodiment may perform a control to immediately make a response without outputting the connecting system utterance.

For example, even in a case where a second utterance interpretation result including the utterance intent of "CheckNews" is acquired based on a user's utterance ("What's") which intends to check weather information, since the cost for recovering a response result is low, the response control unit 140 may immediately make a response such as reading news information.

Further, for example, even in a case where a second utterance interpretation result including an entity of "Artist B" is acquired based on a user's utterance ("Play") which intends to reproduce the song by Artist D, since the cost for recovering a response result is low, the response control unit 140 may immediately reproduce the song by Artist B.

Meanwhile, in a case where the above-described recovery cost is moderate or higher, the response control unit 140 may cause the speech output unit 160 to output the connecting system utterance, wait for acquisition of a first utterance interpretation result on the cloud side, and then perform the response control.

As a response with a moderate recovery cost, for example, operation of a home appliance is assumed. In this case, the response control unit 140 according to the present embodiment may cause the speech output unit 160 to output a relatively short connecting system utterance.

For example, even in a case where an incorrect second utterance interpretation result including an entity of "OFF" is acquired based on a user's utterance ("Turn the light") that intends turning on of the light, the response control unit 140 according to the present embodiment can cause the speech output unit 160 to output a relatively short connecting system utterance such as "The light will be turned off", and receive a first utterance interpretation result during the output of the connecting system utterance, thereby recovering a response content before actually performing a control to turn off the light.

Further, for example, even in a case where an incorrect second utterance interpretation result including an entity of "Up" is acquired based on a user's utterance ("Turn the volume") that intends turning down of the volume, the response control unit 140 can cause the speech output unit 160 to output a relatively short connecting system utterance such as "The volume will be turned up", and receive a first utterance interpretation result during the output of the connecting system utterance, thereby recovering a response content before actually performing a control to turn down the volume.

Further, as a response with a high recovery cost, for example, an operation regarding privacy or security is assumed. In this case, the response control unit 140 according to the present embodiment may cause the speech output unit 160 to output a relatively long connecting system utterance.

For example, even in a case where an incorrect second utterance interpretation result including an utterance intent of "TakePhoto" is acquired based on a user's utterance ("Picture") that intends displaying of the picture, the response control unit 140 according to the present embodiment can cause the speech output unit 160 to output a relatively long connecting system utterance such as "The picture will be taken. Three, two, one.", and receive a first utterance interpretation result during the output of the connecting system utterance, thereby recovering a response content before actually performing a control to shoot the picture.

Further, for example, even in a case where an incorrect second utterance interpretation result including an utterance intent of "RecVoiceMessage" is acquired based on a user's utterance ("Message") that intends displaying of the picture, the response control unit 140 can cause the speech output unit 160 to output a relatively long connecting system utterance such as "The recording will start. Three, two, one, speak.", and receive a first utterance interpretation result during the output of the connecting system utterance, thereby recovering a response content before actually performing a control to perform recording.

In addition, as a response with the highest recovery cost, for example, an operation related to communication with another person or deletion of data is assumed. In this case, the response control unit 140 according to the present embodiment may cause the speech output unit 160 to output a connecting system utterance for inquiring whether or not to execute a response.

For example, even in a case where an incorrect second utterance interpretation result including an utterance intent of "CallOnThePhone" is acquired based on a user's utterance ("Mr. Suzuki") that intends sending of an email to Mr. Suzuki, the response control unit 140 according to the present embodiment may cause the speech output unit 160 to output a connecting system utterance such as "Are you sure you want to call Mr. Suzuki?" for inquiring whether or not to execute a response, thereby controlling execution of a response based on the second utterance interpretation result only when the user approves.

Further, for example, even in a case where an incorrect second utterance interpretation result including an utterance intent of "DeletePhoto" is acquired based on a user's utterance ("This picture") that intends sharing of the picture, the response control unit 140 according to the present embodiment may cause the speech output unit 160 to output a connecting system utterance such as "Are you sure you want to delete this picture?" for inquiring whether or not to execute a response, thereby controlling execution of a response based on the second utterance interpretation result only when the user approves.

Figure 9A:
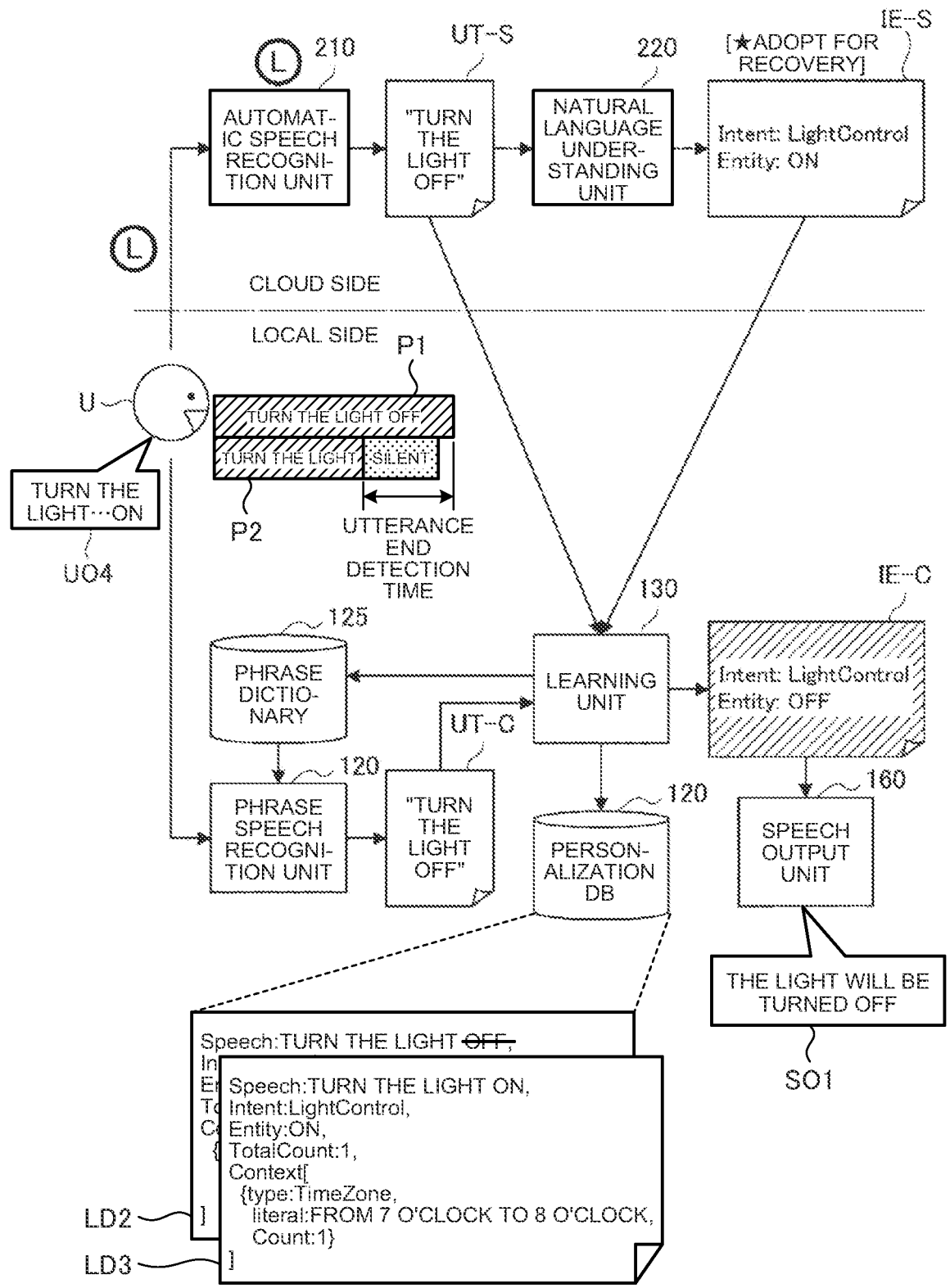
FIG. 9A is a diagram illustrating an example of a response control using a connecting system utterance according to the embodiment.
Figure 9B:
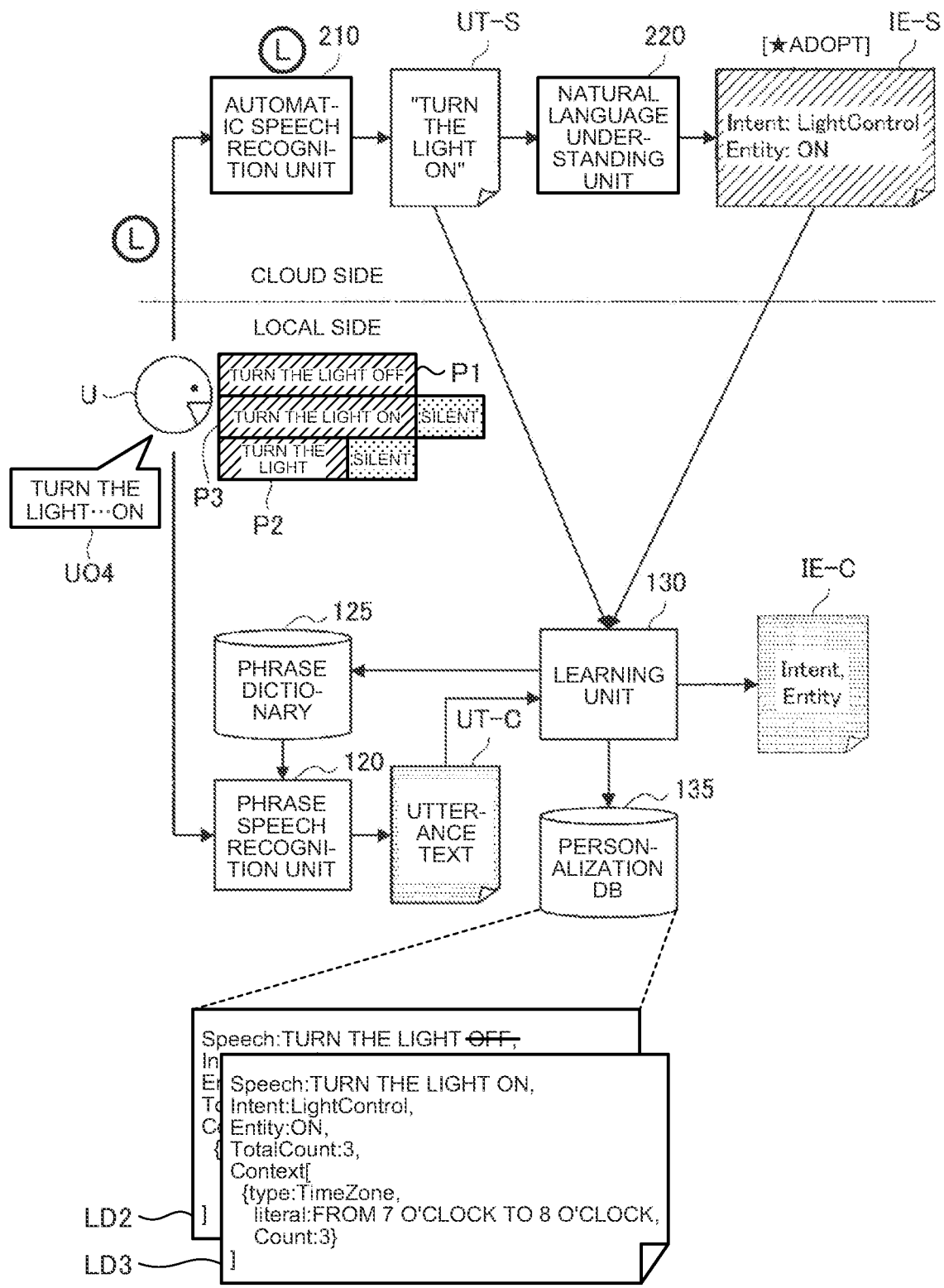
FIG. 9B is a diagram illustrating an example of a response control using a connecting system utterance according to the embodiment.

The connecting system utterance according to the present embodiment has been described above. Next, a response control using the connecting system utterance will be described with a specific example. FIGS. 9A and 9B are diagrams illustrating an example of the response control using the connecting system utterance according to the present embodiment.

In the example illustrated in FIG. 9A, the user U makes an utterance UO4 ("Turn the light . . . on") in a state where the phrase P1 ("Turn the light off") and the short phrase P2 ("Turn the light") are registered in the phrase dictionary 125.

Here, there is an interval between "Turn the light" and "on" in the utterance UO4, since the interval satisfies the utterance end detection time for the phrase P2 ("Turn the light"), the learning unit 130 acquires an incorrect second utterance interpretation result based on the learning data LD2 corresponding to the phrase P2 and including the utterance intent of "LightControl" and the entity of "OFF".

Here, the acquired second utterance interpretation result that indicates the turning off of the light corresponds to a response with the moderate recovery cost described above. Therefore, the response control unit 140 causes the speech output unit 160 to output a relatively short connecting system utterance SO1 ("The light will be turned off") before performing a control to turn off the light.

In addition, the response control unit 140 receives a first utterance interpretation result acquired by the cloud-side processing during the output of the connecting system utterance SO1. Here, since the first utterance interpretation result acquired by the cloud-side processing does not match the second utterance interpretation result acquired by the local-side processing, the response control unit 140 cam adopt, for recovery, a first utterance interpretation result acquired through a more accurate automatic speech recognition processing and natural language understanding processing, and perform an execution control to turn on the light based on the first utterance interpretation result.

Further, the learning unit 130 according to the present embodiment performs processing of extending the utterance end detection time for the short phrase P2 based on the fact that the first utterance interpretation result acquired by the cloud-side processing does not match the second utterance interpretation result acquired based on recognition of the short phrase P2.

With the above-described function of the learning unit 130 according to the present embodiment, thereafter, as illustrated in FIG. 9B, even in a case where the user U makes the utterance UO4 ("Turn the light . . . on"), since the utterance end detection time of the short phrase P2 is extended, it is possible to avoid a situation where the phrase speech recognition unit 120 erroneously recognizes the short phrase P2 based on the utterance UO4.

Here, the response control unit 140 according to the present embodiment can perform an execution control to turn on the light by using the first utterance interpretation result acquired by the cloud-side processing based on the utterance UO4.

Hereinabove, the response control using the connecting system utterance according to the present embodiment has been described with reference to a specific example. Note that, in a case where the number of times of acquisition of the utterance UO4 of "Turn the light . . . on" is further increased after the state illustrated in FIG. 9B, similarly to the phrase P1 of "Turn the light off", learning of the short phrase of "Turn the light" that does not include one segment of the phrase is performed, and thereafter, learning data is selected based on a context as illustrated in FIG. 5I.

Note that the number of times of acquisition included in the learning data according to the present embodiment may be incremented basically based on the first utterance interpretation result acquired by the cloud-side processing. On the other hand, since a short phrase such as "Turn the light" cannot be recognized by the cloud-side processing, the number of times of acquisition of the short phrase is incremented by the local-side processing.

1.6. Control Flow

Figure 11:
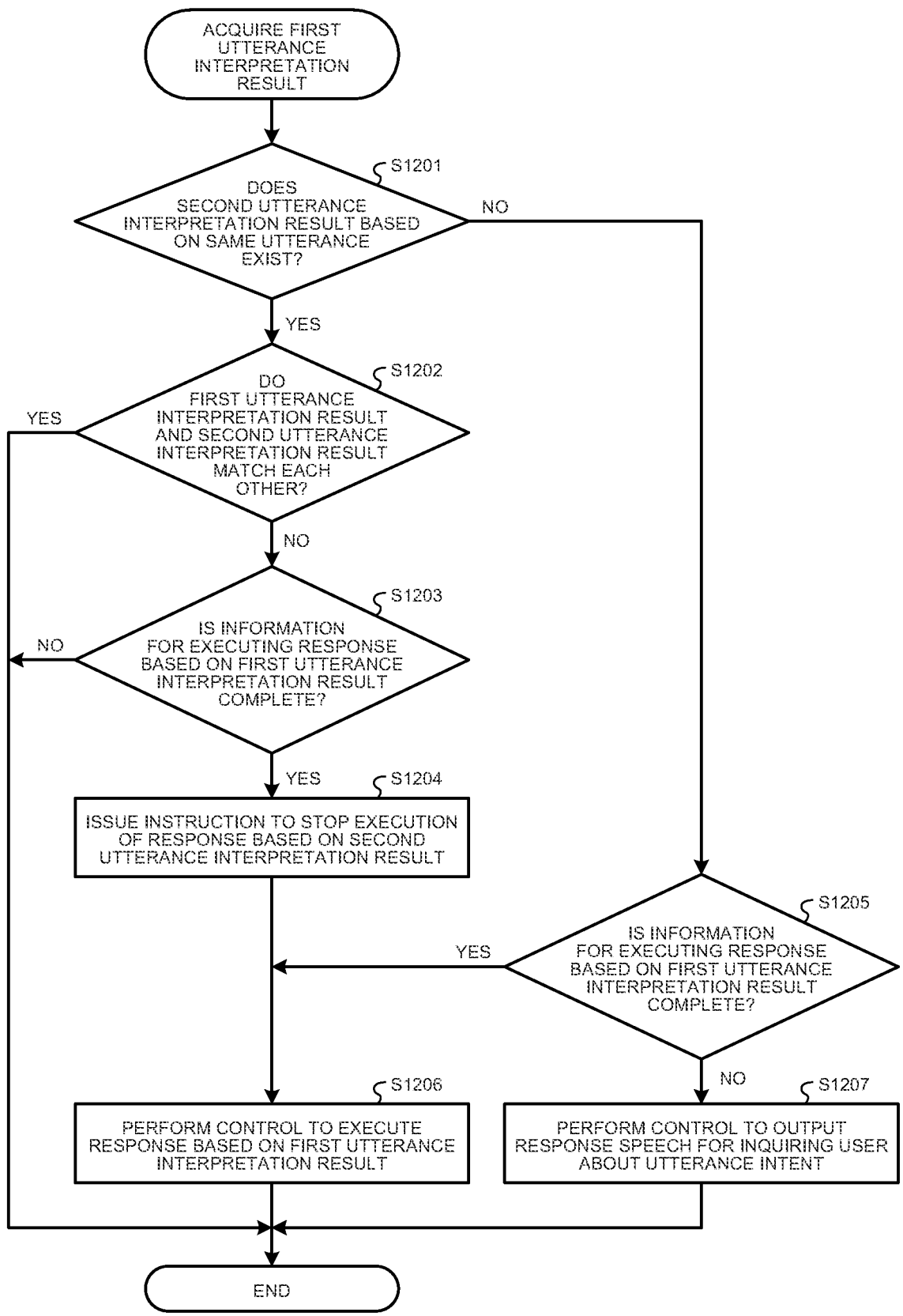
FIG. 11 is a flowchart illustrating a flow of a response control performed by the information processing terminal according to the embodiment.

Next, a flow of a response control according to the present embodiment will be described. FIGS. 10 and 11 are flowcharts each illustrating a flow of a response control performed by the information processing terminal 10.

Note that FIG. 10 illustrates a flow of a response control performed based on a second utterance interpretation result acquired by the information processing terminal 10. Further, FIG. 11 illustrates a flow of a response control performed by the information processing terminal 10 based on a first utterance interpretation result acquired by the information processing server 20.

The information processing terminal 10 according to the present embodiment can first start the response control illustrated in FIG. 10, then perform the response control illustrated in FIG. 11 in parallel, and dynamically change behaviors for the two response controls based on a result of each processing.

First, the flow of the response control performed by the information processing terminal 10 according to the present embodiment based on the second utterance interpretation result will be described with reference to FIG. 10.

Once the learning unit 130 acquires a second utterance interpretation result, the response control unit 140 determines whether or not a recovery cost of a response based on the second utterance interpretation result is moderate or higher (S1101).

Here, in a case where the recovery cost of the response based on the second utterance interpretation result is moderate or higher (S1101: YES), the response control unit 140 causes the speech output unit 160 to output a connecting system utterance having a length corresponding to the recovery cost of the response based on the second utterance interpretation result (S1102).

Then, the response control unit repeatedly determines whether or not there is an instruction to stop the response based on the second utterance interpretation result from a response control flow based on a first utterance interpretation result to be described later, until the output of the connecting system utterance is completed (S1103).

Here, in a case where there is an instruction to stop the response based on the second utterance interpretation result (S1103: YES), the response control unit 140 stops the output of the connecting system utterance performed by the speech output unit 160 (S1104), and only the response control based on the first utterance interpretation control illustrated in FIG. 11 is continued.

On the other hand, in a case where there is no instruction to stop the response based on the second utterance interpretation result (S1103: NO), or in a case where the recovery cost is less than moderate (S1101: NO), the response control unit 140 performs a control to execute the response based on the second utterance interpretation result (S1105). For example, the response control unit 140 may allow function execution based on an utterance intent or entity included in the second utterance interpretation result, and may cause the speech output unit 160 to output a response speech.

Then, the response control unit 140 repeatedly determines whether or not there is an instruction to stop the response based on the second utterance interpretation result from the response control flow based on the first utterance interpretation result to be described later, until a response such as function execution or the output of a response speech is completed (S1106).

Here, in a case where there is an instruction to stop the response based on the second utterance interpretation result (S1106: YES), the response control unit 140 performs a control to stop the response (S1107), and the response control flow based on the second utterance interpretation result ends.

Next, the flow of the response control performed by the information processing terminal 10 according to the present embodiment based on the first utterance interpretation result will be described with reference to FIG. 11.

The information processing terminal 10 according to the present embodiment receives a first utterance interpretation result acquired by the cloud-side processing after the start of the response control flow based on the second utterance interpretation result illustrated in FIG. 10.

Here, the response control unit 140 first determines whether or not a second utterance interpretation result based on the same utterance exists (S1201).

Here, in a case where the second utterance interpretation result based on the same utterance does not exist (S1201: NO), the response control unit 140 then determines whether or not information for executing a response based on the received first utterance interpretation result is complete (S1205). The response control unit 140 determines, for example, whether or not the first utterance interpretation result includes a correct utterance intent or entity necessary for executing the response.

Here, in a case where the information for executing the response based on the first utterance interpretation result is not complete (S1205: NO), the response control unit 140 causes the speech output unit 160 to output a response speech for inquiring the user about the utterance intent (S1207), and ends the response control flow based on the first utterance interpretation result.

Further, in Step S1201, in a case where the second utterance interpretation result based on the same utterance exists (S1201: YES), the response control unit 140 then determines whether or not the first utterance interpretation result and the second utterance interpretation result match each other (S1202).

Here, in a case where the first utterance interpretation result and the second utterance interpretation result match each other (S1202: YES), the response control unit 140 ends the response control flow based on the first utterance interpretation result, and thereafter, the response control based on the second utterance interpretation result illustrated in FIG. 10 is performed.

On the other hand, in a case where the first utterance interpretation result and the second utterance interpretation result do not match each other (S1202: NO), the response control unit 140 then determines whether or not the information for executing the response based on the first utterance interpretation result is complete (S1203).

Here, in a case where the information for executing the response based on the first utterance interpretation result is not complete (S1203: NO), for example, when the short phrase such as "Turn the light" cannot be correctly interpreted on the cloud side, the response control unit 140 ends the response control flow based on the first utterance interpretation result, and thereafter, the response control based on the second utterance interpretation result illustrated in FIG. 10 is performed. Here, the increment of the number of times of acquisition of the short phrase is performed based on the local-side processing.

On the other hand, in a case where the information for executing the response based on the first utterance interpretation result is not complete (S1203: YES), the response control unit 140 issues an instruction to stop the execution of the response based on the second utterance interpretation result with respect to the response control flow based on the second utterance interpretation result illustrated in FIG. 10 (S1204).

Further, the response control unit 140 also performs a control to execute the response based on the first utterance interpretation result (S1206), and ends the response control flow based on the first utterance interpretation result.

Figure 12:
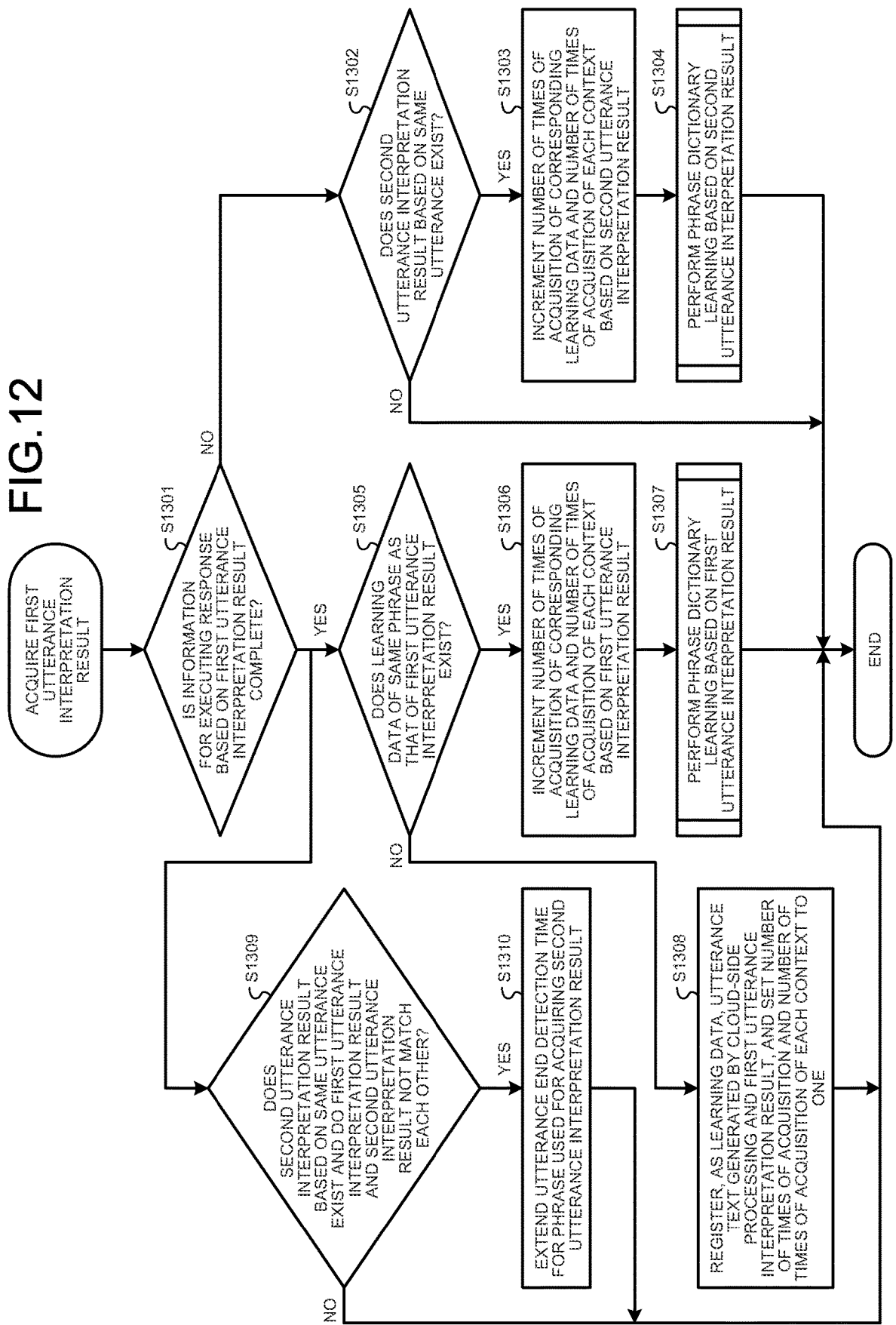
FIG. 12 is a flowchart illustrating a flow of a learning control performed by the information processing terminal according to the embodiment.

Next, a flow of a learning control performed by the information processing terminal 10 according to the present embodiment will be described. FIG. 12 is a flowchart illustrating the flow of the learning control performed by the information processing terminal 10 according to the present embodiment.

Referring to FIG. 12, the learning unit 130 determines whether or not the information necessary for executing the response based on the first utterance interpretation result is complete, after receiving the first utterance interpretation result acquired by the cloud-side processing (S1301).

Here, in a case where the information necessary for executing the response based on the first utterance interpretation result is not complete (S1301: NO), the learning unit 130 then determines whether or not a second utterance interpretation result based on the same utterance exists (S1302).

Here, in a case where the second utterance interpretation result based on the same utterance does not exist (S1302: NO), the learning unit 130 ends the processing for the learning control.

On the other hand, in a case where the information necessary for executing the response based on the first utterance interpretation result is complete (S1301: YES), the learning unit 130 increments the number of times of acquisition of corresponding learning data and the number of times of acquisition of each context based on the second utterance interpretation result (S1303).

Figure 14:
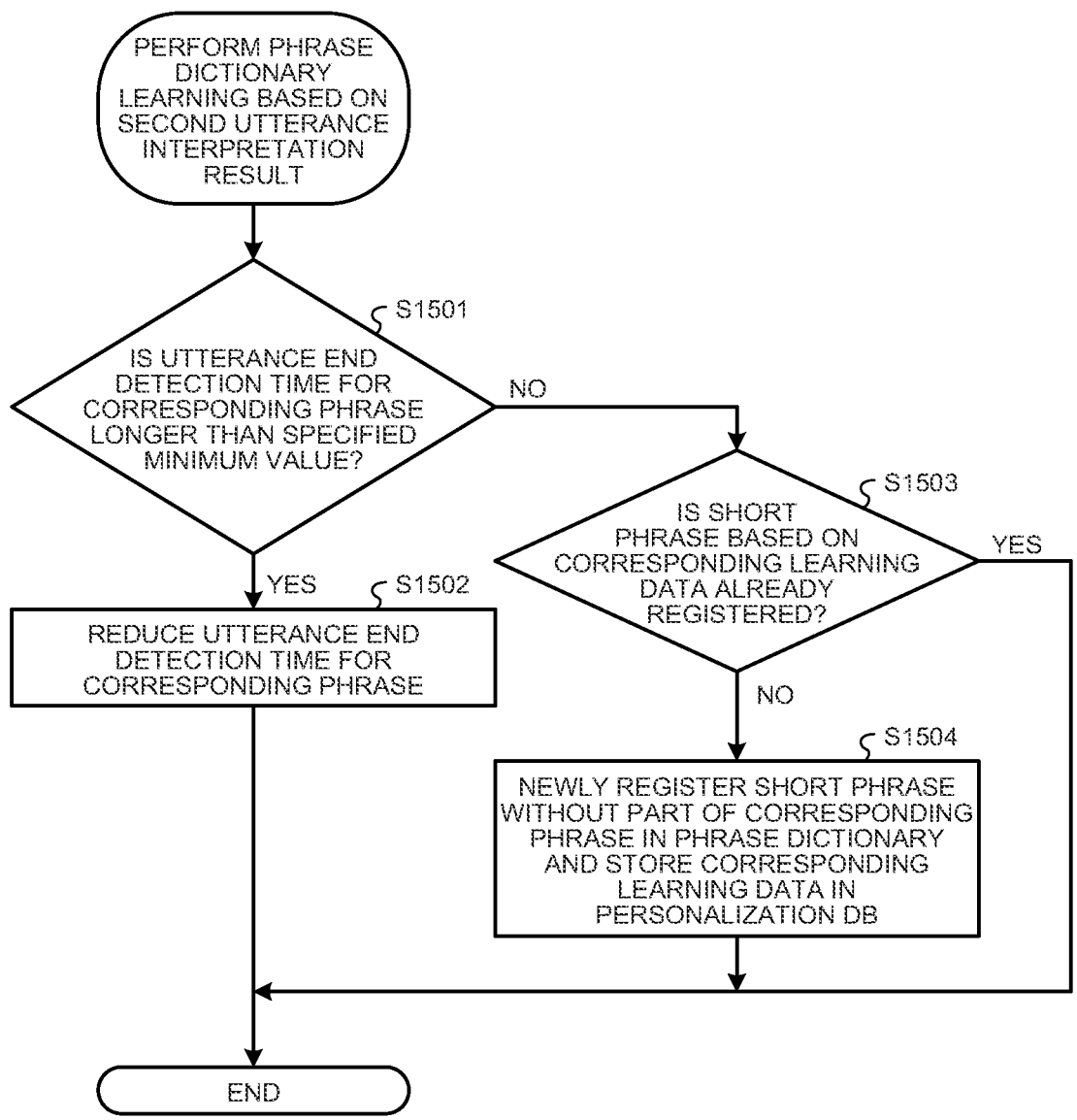
FIG. 14 is a flowchart illustrating a flow of phrase dictionary learning based on a second utterance interpretation result according to the embodiment.

Further, the learning unit 130 then performs a phrase dictionary learning control based on the second utterance interpretation result illustrated in FIG. 14 (S1304).

On the other hand, in Step S1301, in a case where the information necessary for executing the response based on the first utterance interpretation result is complete (S1301: YES), the learning unit 130 then determines whether or not learning data for the same phrase as that of the first utterance interpretation result exists in the personalization DB 135 (S1305).

Here, in a case where the learning data for the same phrase as that of the first utterance interpretation result does not exist in the personalization DB 135 (S1305: NO), the learning unit 130 stores, as learning data in the personalization DB 135, an utterance text generated by the cloud-side processing and the first utterance interpretation result in association with each other, and sets the number of times of acquisition and the number of times of acquisition of each context to 1 (S1308).

On the other hand, in a case where the learning data for the same phrase as that of the first utterance interpretation result exists in the personalization DB 135 (S1305: YES), the learning unit 130 increments the number of times of acquisition of the corresponding learning data and the number of times of acquisition of each context based on the first utterance interpretation result (S1306).

Figure 13:
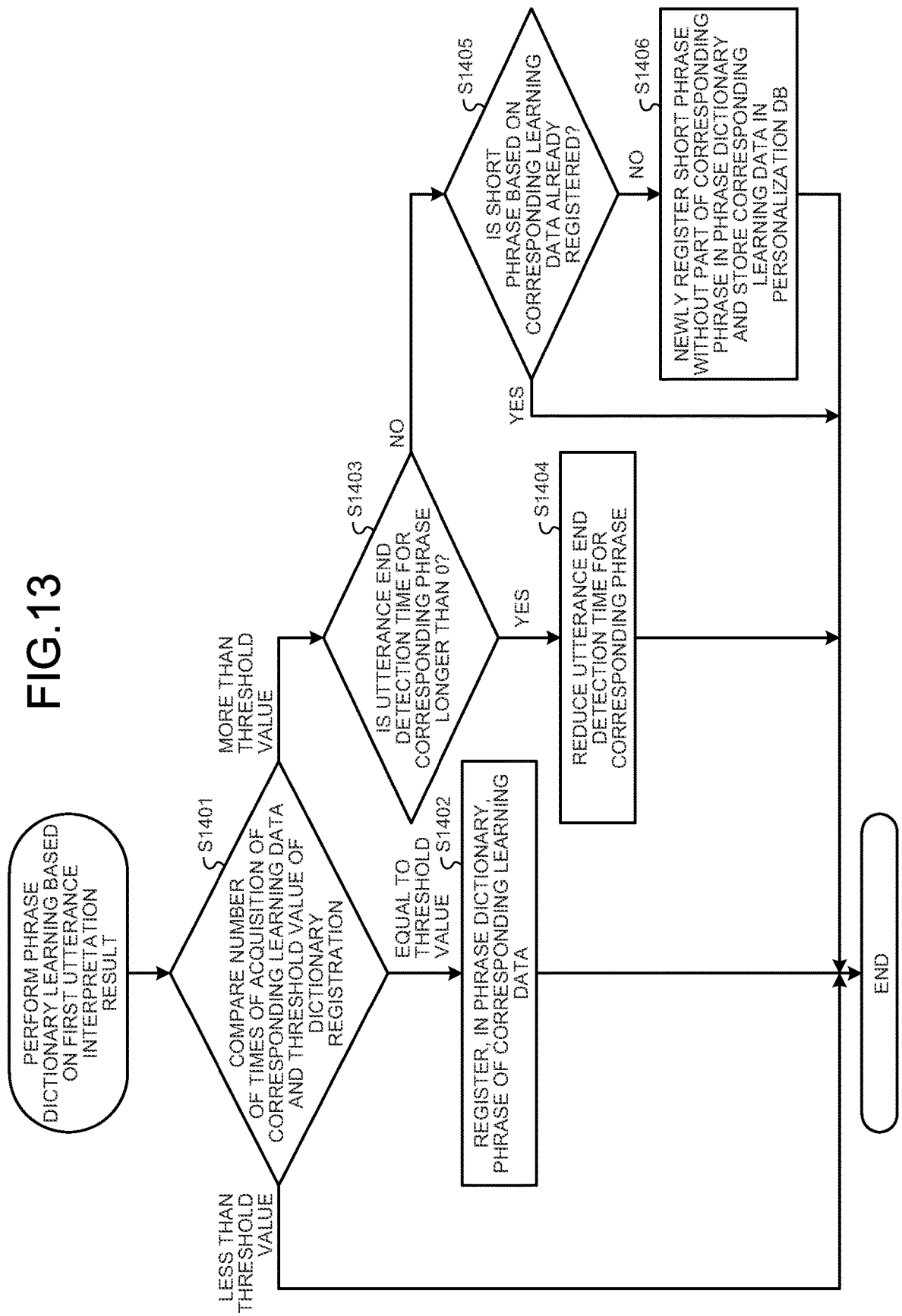
FIG. 13 is a flowchart illustrating a flow of phrase dictionary learning based on a first utterance interpretation result according to the embodiment.

Further, the learning unit 130 then performs a phrase dictionary learning control based on the first utterance interpretation result illustrated in FIG. 13 (S1307).

In step S1301, in a case where the information necessary for executing the response based on the first utterance interpretation result is not complete (S1301: NO), the learning unit 130 further determines whether or not the second utterance interpretation result based on the same utterance exists and whether or not the first utterance interpretation result and the second utterance interpretation result match each other (S1309).

Here, in a case where the second utterance interpretation result based on the same utterance exists and the first utterance interpretation result and the second utterance interpretation result do not match each other (S1309: YES), the learning unit 130 extends an utterance end detection time for a phrase used for acquiring the second utterance interpretation result (S1310).

Next, a flow of learning phrase dictionary learning according to the present embodiment will be described. First, a flow of phrase dictionary learning based on the first utterance interpretation result according to the present embodiment will be described. FIG. 13 is a flowchart illustrating the flow of the phrase dictionary learning based on the first utterance interpretation result according to the present embodiment.

The learning unit 130 first compares the number of times of acquisition of corresponding learning data with a threshold value of dictionary registration (for example, three times) (S1401).

Here, in a case where the number of times of acquisition of the learning data is less than the threshold value of dictionary registration (S1401: less than the threshold value), the learning unit 130 ends the phrase dictionary learning based on the first utterance interpretation result.

In a case where the number of times of acquisition of the learning data is equal to the threshold value of dictionary registration (S1401: equal to the threshold value), the learning unit 130 registers a phrase of the corresponding learning data in the phrase dictionary (S1402).

Meanwhile, in a case where the number of times of acquisition of the learning data is more than the threshold value of dictionary registration (S1401: more than the threshold value), the learning unit 130 then determines whether or not an utterance end detection time for the corresponding phrase is longer than 0 (S1403).

Here, in a case where the utterance end detection time for the corresponding phrase is longer than 0 (S1403: YES), the learning unit 130 reduces the utterance end detection time for the corresponding phrase (S1404), and ends the phrase dictionary learning based on the first utterance interpretation result.

On the other hand, in a case where the utterance end detection time for the corresponding phrase is 0 (S1403: NO), the learning unit 130 then determines whether or not a short phrase based on the corresponding learning data is already registered in the phrase dictionary 125 (S1405).

Here, in a case where the short phrase based on the corresponding learning data is not registered in the phrase dictionary 125 (S1405: NO), the learning unit 130 newly registers, in the phrase dictionary 125, the short phrase that does not include a part of the corresponding phrase, and stores, in the personalization DB 135, the learning data corresponding to the short phrase.

Next, a flow of phrase dictionary learning based on the second utterance interpretation result according to the present embodiment will be described. FIG. 14 is a flowchart illustrating the flow of the phrase dictionary learning based on the second utterance interpretation result according to the present embodiment.

The learning unit 130 first determines whether or not an utterance end detection time for a corresponding phrase is longer than a specified minimum value (S1501).

Here, in a case where the utterance end detection time for the corresponding phrase is longer than the specified minimum value (S1501: YES), the learning unit 130 reduces the utterance end detection time for the corresponding phrase (S1502).

On the other hand, in a case where the utterance end detection time for the corresponding phrase is the specified minimum value (S1501: NO), the learning unit 130 then determines whether or not a short phrase based on the corresponding learning data is already registered in the phrase dictionary 125 (S1503).

Here, in a case where the short phrase based on the corresponding learning data is already registered in the phrase dictionary 125 (S1503: YES), the learning unit 130 ends the phrase dictionary learning based on the second utterance interpretation result.

On the other hand, in a case where the short phrase based on the corresponding learning data is not registered in the phrase dictionary 125 (S1503: NO), the learning unit 130 newly registers, in the phrase dictionary 125, the short phrase that does not include a part of the corresponding phrase, and stores, in the personalization DB 135, the learning data corresponding to the short phrase (S1504).

1.7. Effects

Hereinabove, the response control based on the first utterance interpretation result and the second utterance interpretation result according to the present embodiment has been described in detail. As described above, with the information processing terminal 10 according to the present embodiment, it is possible to greatly reduce a response time to a user's utterance by performing local-side learning of a result of natural language understanding processing performed on a phrase that the user frequently uses or a phrase explicitly indicated by the user.

Further, with the above-described function of the information processing terminal 10 according to the present embodiment, the response time can be reduced as the user frequently uses the system, and the user can realize human-like language recognition performed by the system and a process in which a response speed based on the language recognition is increased.

Further, with the information processing terminal 10 according to the present embodiment, as the user frequently uses the system, it is possible to make a response using an omitted short phrase that cannot be understood by general-purpose natural language processing performed on the cloud side, and it is possible to increase a speed of a total response from when the user starts utterance to when the response is executed.

Further, with the information processing terminal 10 according to the present embodiment, it is possible to appropriately interpret an omitted short phrase based on various contexts including a user's situation, and the user can use a phrase closer to a natural utterance to perform function operation.

In addition, with the information processing terminal 10 according to the present embodiment, in a case where the recovery cost is moderate or higher, it is possible to correct a response content based on a result of cloud-side interpretation even when an erroneous interpretation is performed on the local side, by outputting a connecting system utterance.

Further, with the information processing terminal 10 according to the present embodiment, it is possible to effectively reduce a communication cost of the system for speech data transfer by caching a frequently used response speech on the local side.

Hereinabove, the functions of the information processing terminal 10 and the information processing server 20 according to the present embodiment have been described in detail. Note that the information processing terminal 10 and the information processing server 20 according to the present embodiment can perform various controls that enhance the convenience of the user, in addition to the control described above.

For example, in the above description, a case where the information processing terminal 10 generates a short phrase that does not include the last one segment of the phrase has been described as a main example, but a method of generating a short phrase according to the present embodiment is not limited to the example. The information processing terminal 10 may perform a control so that, for example, the first segment is cut according to a characteristic of a language, or a representative keyword such as a proper noun included in a phrase remains in a short phrase. Further, the information processing terminal 10 may generate a short phrase obtained by omitting a character or phoneme, rather than a segment.

Further, the information processing terminal 10 may use, for the determination of the same short phrase, information such as the accent or intonation of the user in addition to the context. The information processing terminal 10 can also store, for example, the accent or intonation of the user that is related to the original phrase in advance, and determine whether or not the accent or intonation when a short phrase is uttered is similar to that of the original phrase.

Further, although a case where the personalization DB 135 according to the present embodiment is constructed for each user on the local side has been described as a main example, the information processing server 20 according to the present embodiment can collect learning data from a plurality of information processing terminals 10, classify a statistically large number of processings based on a user attribute such as age, sex, or region, and determine the classified processing as natural language understanding processing.

Further, the response using the short phrase according to the present embodiment can also be applied to, for example, automatic translation in addition to voice interaction. The information processing terminal 10 can output, for example, a corresponding translation that complements a part omitted in a user's utterance.

Further, the priorities of the first utterance interpretation result and the second utterance interpretation result according to the present embodiment may be dynamically determined. For example, in a case where the user is outdoors or the like, it is assumed that there is a lot of noise, and therefore only the first utterance interpretation result acquired by the cloud side may be used for a response control.

On the other hand, in a case where the reliability of the first utterance interpretation result acquired by the cloud side is low, the information processing terminal 10 can preferentially use the second utterance interpretation result for a response control.

Further, the connecting system utterance according to the present embodiment may be replaced by, for example, text display or LED lighting.

Further, the learning according to the present embodiment may be performed or not performed according to a user's instruction, or may be arbitrarily edited by the user who has confirmed a learning result.

2. HARDWARE CONFIGURATION EXAMPLE

Figure 15:
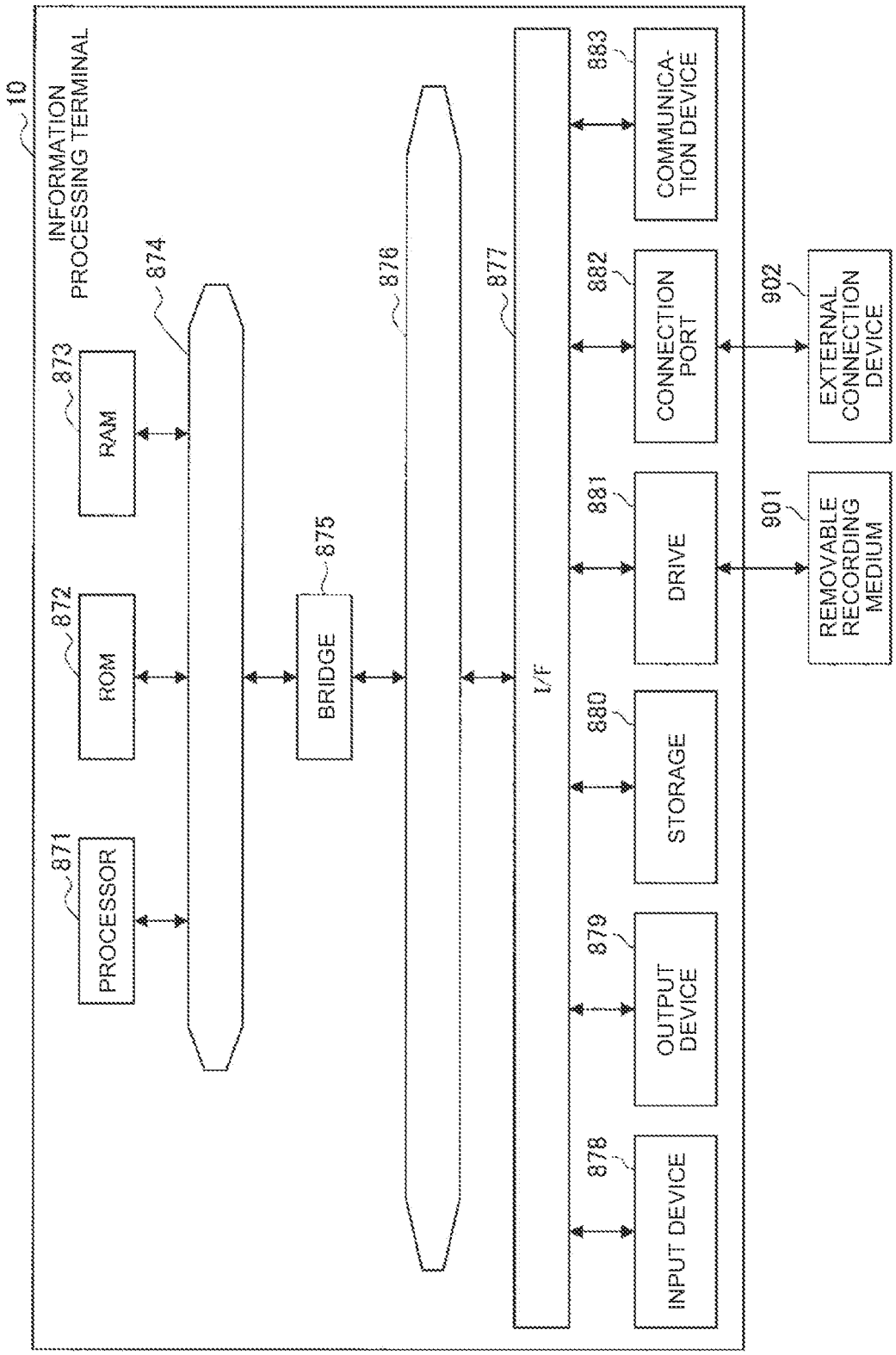
FIG. 15 is a diagram illustrating a hardware configuration example of an information processing terminal according to an embodiment of the present disclosure.

Next, a hardware configuration example of the information processing terminal 10 according to the embodiment of the present disclosure will be described. FIG. 15 is a block diagram illustrating a hardware configuration example of the information processing terminal 10 according to the embodiment of the present disclosure. Referring to FIG. 15, the information processing terminal 10 includes, for example, a processor 871, a read only memory (ROM) 872, a random access memory (RAM) 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated herein may be further included.

(Processor 871)

For example, the processor 871 functions as an arithmetic processing device or a control device, and controls an overall operation of each component or a part thereof based on various programs recorded in the ROM 872, the RAM 873, the storage 880, or a removable recording medium 901.

(ROM 872 and RAM 873)

The ROM 872 is a means for storing a program read by the processor 871, data to be used for calculation, or the like. The RAM 873 temporarily or permanently stores, for example, the program read by the processor 871, various parameters that change as appropriate when the program is executed, or the like.

(Host Bus 874, Bridge 875, External Bus 876, and Interface 877)

The processor 871, the ROM 872, and the RAM 873 are mutually connected via, for example, the host bus 874 capable of high-speed data transmission. Meanwhile, the host bus 874 is connected to the external bus 876, which has a relatively low data transmission rate, via the bridge 875, for example. In addition, the external bus 876 is connected to various components via the interface 877.

(Input Device 878)

As the input device 878, for example, a mouse, a keyboard, a touch panel, a button, a switch, a lever, or the like is used. Further, a remote controller capable of transmitting a control signal using infrared rays or other radio waves may also be used as the input device 878. In addition, the input device 878 includes a speech input device such as a microphone.

(Output Device 879)

The output device 879 is a device capable of visually or audibly notifying a user of acquired information, such as a display device such as a cathode ray tube (CRT), a liquid crystal display (LCD), and an organic EL, an audio output device such as a speaker or a headphone, a printer, a mobile phone, or a facsimile. In addition, the output device 879 according to the present disclosure includes various vibration devices capable of outputting haptic stimulation.

(Storage 880)

The storage 880 is a device configured to store various types of data. As the storage 880, for example, a magnetic storage device such as a hard disk drive (HDD), a semiconductor storage device, an optical storage device, or a magneto-optical storage device is used.

(Drive 881)

The drive 881 is a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, or various semiconductor storage media. It is a matter of course that the removable recording medium 901 may be, for example, an IC card equipped with a non-contact IC chip, or an electronic device.

(Connection Port 882)

The connection port 882 is a port configured to connect an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, or an IC recorder.

(Communication Device 883)

The communication device 883 is a communication device for connection to a network, and is, for example, a communication card for a wired or wireless LAN, Bluetooth (registered trademark), or a wireless USB (WUSB), a router for optical communication, a router for an asymmetric digital subscriber line (ADSL), or a modem for various communications.

3. CONCLUSION

As described above, the information processing terminal 10 that implements the information processing method according to the embodiment of the present disclosure includes the response control unit 140 that controls a response to a user's utterance based on a first utterance interpretation result and a second utterance interpretation result. The first utterance interpretation result is a result of natural language understanding processing for an utterance text generated by automatic speech recognition processing based on the user's utterance, and the second utterance interpretation result may be an interpretation result acquired based on learning data in which the first utterance interpretation result and the utterance text used to acquire the first utterance interpretation result are associated with each other. Here, the response control unit 140 according to the present embodiment controls a response to the user's utterance based on the second utterance interpretation result in a case where the second utterance interpretation result is acquired based on the user's utterance before acquisition of the first utterance interpretation result, which is one of the characteristics. With such a configuration, it is possible to effectively reduce a response time to a user's utterance.

As described above, the preferred embodiments of the present disclosure have been described in detail with reference to the accompanying drawings, but the technical scope of the present disclosure is not limited to such examples. It will be apparent to those skilled in the art of the present disclosure that various modifications or alterations can be conceived within the scope of the technical idea described in the claims and it is naturally understood that these modifications or alterations fall within the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

It is also possible to create a program for causing hardware such as a CPU, a ROM, and a RAM installed in a computer to exhibit the same functions as those of the components of the information processing terminal 10, and it is possible to provide a computer readable recording medium in which the program is recorded.

In addition, the respective steps related to the processing performed by the information processing terminal 10 in the present specification are not necessarily performed in a time-series manner in the order described in the flowchart. For example, the respective steps related to the processing performed by the information processing terminal 10 may be performed in an order different from the order described in the flowchart, or may be performed in parallel.

Note that the following configurations also fall within the technical scope of the present disclosure.

(1)

An information processing device comprising:
   a response control unit that controls a response to a user's utterance based on a first utterance interpretation result and a second utterance interpretation result, wherein
   the first utterance interpretation result is a result of natural language understanding processing for an utterance text generated by automatic speech recognition processing based on the user's utterance,
   the second utterance interpretation result is an interpretation result acquired based on learning data in which the first utterance interpretation result and the utterance text used to acquire the first utterance interpretation result are associated with each other, and
   the response control unit controls the response to the user's utterance based on the second utterance interpretation result in a case where the second utterance interpretation result is acquired based on the user's utterance before acquisition of the first utterance interpretation result.

(2)

The information processing device according to (1), wherein
   the response control unit controls the response to the user's utterance based on the first utterance interpretation result in a case where the second utterance interpretation result is not acquired.

(3)

The information processing device according to (1) or (2), wherein
   the response control unit controls the response to the user's utterance based on the first utterance interpretation result in a case where the first utterance interpretation result and the second utterance interpretation result are different from each other.

(4)

The information processing device according to (3), wherein
   the response control unit controls to output a connecting system utterance based on acquisition of the second utterance interpretation result and controls the response to the user's utterance based on the first utterance interpretation result acquired during the output of the connecting system utterance, and the second utterance interpretation result.

(5)

The information processing device according to (4), wherein
   the response control unit determines a length of the connecting system utterance based on a recovery cost for recovering a result of the response based on the second utterance interpretation result.

(6)

The information processing device according to (5), wherein
   in a case where the recovery cost is equal to or more than a predetermined threshold value, the response control unit controls to output the connecting system utterance for inquiring whether or not to execute the response based on the second utterance interpretation result, and performs a control to execute the response based on the second utterance interpretation result when the user approves.

(7)

The information processing device according to any one of (1) to (6), wherein
   in a case where a plurality of the second utterance interpretation results are acquired based on the user's utterance, the response control unit controls the response to the user's utterance based on similarity between a context acquired when the user's utterance is made, and a context stored together with the learning data.

(8)

The information processing device according to any one of (1) to (7), further comprising
   a learning unit that learns the utterance text generated by the automatic speech recognition processing based on the user's utterance and the first utterance interpretation result based on the utterance text in association with each other, and stores, as the learning data, the utterance text and the first utterance interpretation result.

(9)

The information processing device according to (8), wherein
   in a case where the number of times of acquisition of the same first utterance interpretation result based on the same utterance text is equal to or more than a predetermined threshold value, the learning unit registers a phrase corresponding to the utterance text in a phrase dictionary, and
   acquires a second utterance interpretation result corresponding to the phrase from the learning data based on recognition of the phrase by phrase speech recognition using the phrase dictionary.

(10)

The information processing device according to (9), wherein
   the learning unit registers an utterance end detection time for the phrase in the phrase dictionary together with the phrase, and reduces the utterance end detection time as the number of times of acquisition is increased.

(11)

The information processing device according to (10), wherein
   in a case where a length of the utterance end detection time is 0, the learning unit registers a short phrase that does not include a part of the phrase in the phrase dictionary, and stores new learning data for the short phrase that takes over the first utterance interpretation result from the learning data for the phrase.

(12)

The information processing device according to (11), wherein
   in a case where the length of the utterance end detection time is 0, the learning unit registers, in the phrase dictionary, the short phrase that does not include a part of an ending of the phrase.

(13)

The information processing device according to (11) or (12), wherein
the learning unit registers an utterance end detection time for the short phrase in the phrase dictionary together with the short phrase.

(14)

The information processing device according to (13), wherein
the learning unit reduces the utterance end detection time for the short phrase to a predetermined length as the number of times of recognition of the short phrase is increased.

(15)

The information processing device according to (14), wherein
in a case where the acquired first utterance interpretation result and the second utterance interpretation result acquired based on the recognition of the short phrase do not match each other, the learning unit extends the utterance end detection time for the short phrase.

(16)

The information processing device according to any one of (9) to (15), further comprising
a speech recognition unit that performs phrase speech recognition processing based on the user's utterance by using the phrase dictionary.

(17)

The information processing device according to any one of (1) to (16), further comprising
a communication unit that transmits speech data for the user's utterance to an external device, and receives the utterance text generated by the automatic speech recognition processing based on the speech data, and the first utterance interpretation result which is a result of the natural language understanding processing for the utterance text.

(18)

The information processing device according to (17), further comprising
a speech accumulation unit that stores a synthesized speech synthesized by the external device.

(19)

The information processing device according to (18), further comprising
a speech output unit that outputs the synthesized speech stored in the speech accumulation unit under a control of the response control unit.

(20)

An information processing method comprising:
controlling, by a processor, a response to a user's utterance based on a first utterance interpretation result and a second utterance interpretation result, wherein
the first utterance interpretation result is a result of natural language understanding processing for an utterance text generated by automatic speech recognition processing based on the user's utterance,
the second utterance interpretation result is an interpretation result acquired based on learning data in which the first utterance interpretation result and the utterance text used to acquire the first utterance interpretation result are associated with each other, and
the controlling of the response further includes controlling the response to the user's utterance based on the second utterance interpretation result in a case where the second utterance interpretation result is acquired based on the user's utterance before acquisition of the first utterance interpretation result.

REFERENCE SIGNS LIST

10 INFORMATION PROCESSING TERMINAL 10
120 PHRASE SPEECH RECOGNITION UNIT
125 PHRASE DICTIONARY
130 LEARNING UNIT
135 PERSONALIZATION DB
140 RESPONSE CONTROL UNIT
150 SPEECH ACCUMULATION UNIT
155 SPEECH DB
160 SPEECH OUTPUT UNIT
190 SERVER COMMUNICATION UNIT
INFORMATION PROCESSING SERVER
210 AUTOMATIC SPEECH RECOGNITION UNIT
220 NATURAL LANGUAGE UNDERSTANDING UNIT
230 SERVICE FUNCTION CONTROL UNIT
240 SPEECH SYNTHESIZING UNIT

The invention claimed is:

1. An information processing device, comprising:
a processor configured to:
control a response to a user's utterance based on a first utterance interpretation result and a second utterance interpretation result, wherein
the first utterance interpretation result is acquired during an output of a connecting system utterance,
the first utterance interpretation result and the second utterance interpretation result are different from each other,
the first utterance interpretation result is a result of natural language understanding processing for an utterance text generated by automatic speech recognition processing based on the user's utterance, and
the second utterance interpretation result is an interpretation result acquired based on learning data in which the first utterance interpretation result and the utterance text used to acquire the first utterance interpretation result are associated with each other; and
control to output the connecting system utterance based on the acquisition of the second utterance interpretation result.

2. The information processing device according to claim 1, wherein
the processor is further configured to control the response to the user's utterance based on the first utterance interpretation result in a case where the second utterance interpretation result is unavailable.

3. The information processing device according to claim 1, wherein
the processor is further configured to determine a length of the connecting system utterance based on a recovery cost for recovering a result of the response based on the second utterance interpretation result.

4. The information processing device according to claim 3, wherein
in a case where the recovery cost is equal to or more than a specific threshold value, the processor is further configured to:
control to output the connecting system utterance to inquire for execution of the response based on the second utterance interpretation result; and perform a control to execute the response based on the second utterance interpretation result based on user approval.

5. The information processing device according to claim 1, wherein
in a case where a plurality of second utterance interpretation results are acquired based on the user's utterance,
the plurality of second utterance interpretation results includes the second utterance interpretation result,
the processor is further configured to control the response to the user's utterance based on a similarity between a first context and a second context,
the first context is acquired based on the user's utterance, and the second context is stored together with the learning data.

6. The information processing device according to claim 1, wherein the processor is further configured to:
learn the utterance text generated by the automatic speech recognition processing based on the user's utterance and the first utterance interpretation result; and
store, as the learning data, the utterance text and the first utterance interpretation result.

7. The information processing device according to claim 3, wherein
in a case where a number of times of the acquisition of the same first utterance interpretation result based on the same utterance text is equal to or more than a specific threshold value, the processor is further configured to:
register a phrase corresponding to the utterance text in a phrase dictionary; and
acquire a third utterance interpretation result corresponding to the phrase from the learning data based on a recognition of the phrase by phrase speech recognition using the phrase dictionary.

8. The information processing device according to claim 7, wherein
the processor is further configured to:
register a first utterance end detection time for the phrase in the phrase dictionary together with the phrase; and
reduce the first utterance end detection time as the number of times of the acquisition of the same first utterance interpretation result is increased.

9. The information processing device according to claim 8, wherein
in a case where a length of the first utterance end detection time is zero, the processor is further configured to:
register a short phrase that excludes a part of the phrase in the phrase dictionary; and
store new learning data for the short phrase that takes over the first utterance interpretation result from the learning data for the phrase.

10. The information processing device according to claim 9, wherein
in a case where the length of the first utterance end detection time is zero, the processor is further configured to register, in the phrase dictionary, the short phrase that excludes a part of an ending of the phrase.

11. The information processing device according to claim 9, wherein
the processor is further configured to register a second utterance end detection time for the short phrase in the phrase dictionary together with the short phrase.

12. The information processing device according to claim 11, wherein
the processor is further configured to reduce the second utterance end detection time for the short phrase to a specific length as a number of times of recognition of the short phrase is increased.

13. The information processing device according to claim 12, wherein
in a case where the acquired first utterance interpretation result and the second utterance interpretation result acquired based on a recognition of the short phrase are different, the processor is further configured to extend the second utterance end detection time for the short phrase.

14. The information processing device according to claim 7, wherein
the processor is further configured to perform phrase speech recognition processing based on the user's utterance by using the phrase dictionary.

15. The information processing device according to claim 1, wherein the processor is further configured to:
output speech data for the user's utterance to an external device;
receive the utterance text generated by the automatic speech recognition processing based on the speech data, and
receive the first utterance interpretation result which is a result of the natural language understanding processing for the utterance text.

16. The information processing device according to claim 15, wherein the processor is further configured to store a synthesized speech synthesized by the external device.

17. The information processing device according to claim 16, further comprising a speaker configured to output the stored synthesized speech.

18. An information processing method, comprising:
controlling, by a processor, a response to a user's utterance based on a first utterance interpretation result and a second utterance interpretation result, wherein
the first utterance interpretation result is acquired during an output of a connecting system utterance,
the first utterance interpretation result and the second utterance interpretation result are different from each other,
the first utterance interpretation result is a result of natural language understanding processing for an utterance text generated by automatic speech recognition processing based on the user's utterance, and
the second utterance interpretation result is an interpretation result acquired based on learning data in which the first utterance interpretation result and the utterance text used to acquire the first utterance interpretation result are associated with each other; and
controlling, by the processor, a speaker to output the connecting system utterance based on the acquisition of the second utterance interpretation result.

* * * * *